United States Patent
Sugiyama et al.

(10) Patent No.: US 12,326,418 B2
(45) Date of Patent: Jun. 10, 2025

(54) STANDARD SAMPLE FILM, METHOD FOR PRODUCING STANDARD SAMPLE FILM, STANDARD SAMPLE, SAMPLE SET, QUANTITATIVE ANALYSIS METHOD, AND TRANSFER FILM

(71) Applicants: FUJIFILM Corporation, Tokyo (JP); THE UNIVERSITY OF TOKYO, Tokyo (JP)

(72) Inventors: Takuro Sugiyama, Kanagawa (JP); Yuko Terao, Kanagawa (JP); Yasuhiko Hirana, Kanagawa (JP); Tetsuro Otsuka, Kanagawa (JP); Akinori Sugishima, Kanagawa (JP); Yasuharu Shiraishi, Kanagawa (JP); Takafumi Hirata, Tokyo (JP); Yoshiki Makino, Tokyo (JP)

(73) Assignees: FUJIFILM Corporation, Tokyo (JP); THE UNIVERSITY OF TOKYO, Tokyo (JP)

( * ) Notice: Subject to any disclaimer, the term of this patent is extended or adjusted under 35 U.S.C. 154(b) by 547 days.

(21) Appl. No.: 17/879,775

(22) Filed: Aug. 3, 2022

(65) Prior Publication Data
US 2022/0381737 A1 Dec. 1, 2022

Related U.S. Application Data

(63) Continuation of application No. PCT/JP2021/002470, filed on Jan. 25, 2021.

(30) Foreign Application Priority Data

Feb. 7, 2020 (JP) .............................. JP2020-019351
Nov. 30, 2020 (JP) .............................. JP2020-198759

(51) Int. Cl.
| | | |
|---|---|---|
| G01N 27/64 | (2006.01) | |
| H01J 49/10 | (2006.01) | |
| H01J 49/40 | (2006.01) | |

(52) U.S. Cl.
CPC ............ *G01N 27/64* (2013.01); *H01J 49/105* (2013.01); *H01J 49/40* (2013.01)

(58) Field of Classification Search
CPC .................. G01N 27/64; G01N 27/66; G01N 2223/0816; G01N 2223/61;
(Continued)

(56) References Cited

U.S. PATENT DOCUMENTS 7,067,834 B2 6/2006 Horigane et al.
7,138,624 B2 11/2006 Kato
(Continued)

FOREIGN PATENT DOCUMENTS

CN 104950036 9/2015
CN 108982174 12/2018
(Continued)

OTHER PUBLICATIONS

"Office Action of Taiwan Counterpart Application", issued on Sep. 11, 2024, with English translation thereof, p. 1- p. 10.
(Continued)

*Primary Examiner* — Michael Maskell
(74) *Attorney, Agent, or Firm* — JCIPRNET

(57) ABSTRACT

Provided are a standard sample film for use in laser ablation inductively coupled plasma mass spectrometry, the standard sample film containing an organic substance and having a small variation in signal intensity of an ion of a metal element depending on a measurement position; a standard sample; a method for producing a standard sample film; a sample set; a quantitative analysis method; and a transfer film. The standard sample film of the present invention is a
(Continued)

standard sample film for use in laser ablation inductively coupled plasma mass spectrometry, the standard sample film containing a polymer and a metal element, and having a maximum height difference in film thickness of the standard sample film of 0.50 μm or less.

22 Claims, 4 Drawing Sheets

(58) Field of Classification Search
CPC . G01N 23/2258; G01N 1/2813; H01J 49/105; H01J 49/40; H01J 49/0009; H01J 49/10; H01J 49/26
USPC .......................................... 250/281, 282, 288
See application file for complete search history.

(56) References Cited

U.S. PATENT DOCUMENTS

| | | | |
|---|---|---|---|
| 7,959,791 | B2 | 6/2011 | Kjaer et al. |
| 2014/0070085 | A1 | 3/2014 | Molloy et al. |
| 2014/0238155 | A1 | 8/2014 | Van Berkel et al. |

FOREIGN PATENT DOCUMENTS

| | | | |
|---|---|---|---|
| CN | 109187137 | 1/2019 | |
| JP | S49073968 | 7/1974 | |
| JP | S60129650 | 7/1985 | |
| JP | H10148605 | 6/1998 | |
| JP | 2004069440 | 3/2004 | |
| JP | 2004212206 | 7/2004 | |
| JP | 2005024332 | 1/2005 | |
| JP | 2005181236 | 7/2005 | |
| JP | 2006071608 | 3/2006 | |
| JP | 2006170854 | 6/2006 | |
| JP | 2008545952 | 12/2008 | |
| JP | 2013238455 | 11/2013 | |
| JP | 2018136190 | 8/2018 | |
| JP | 2018185200 | 11/2018 | |
| JP | 2019078622 | 5/2019 | |
| KR | 20160091185 | 8/2016 | |
| WO | 2019202690 | 10/2019 | |
| WO | 2019210233 | 10/2019 | |
| WO | WO-2019210233 A1 * | 10/2019 | ............... C07K 1/13 |

OTHER PUBLICATIONS

"Request for the Submission of an Opinion of Korea Counterpart Application", with English translation thereof, issued on Sep. 30, 2024, pp. 1-12.
"International Search Report (Form PCT/ISA/210) of PCT/JP2021/002470," mailed on Mar. 30, 2021, with English translation thereof, pp. 1-5.
"Written Opinion of the International Searching Authority (Form PCT/ISA/237)" of PCT/JP2021/002470, mailed on Mar. 30, 2021, with English translation thereof, pp. 1-6.
"Office Action of Japan Counterpart Application", issued on Sep. 19, 2023, with English translation thereof, p. 1-p. 15.
"Search Report of Europe Counterpart Application", issued on Jun. 29, 2023, pp. 1-8.

* cited by examiner

STANDARD SAMPLE FILM, METHOD FOR PRODUCING STANDARD SAMPLE FILM, STANDARD SAMPLE, SAMPLE SET, QUANTITATIVE ANALYSIS METHOD, AND TRANSFER FILM

CROSS-REFERENCE TO RELATED APPLICATIONS

This application is a Continuation of PCT International Application No. PCT/JP2021/002470 filed on Jan. 25, 2021, which claims priority under 35 U.S.C. § 119(a) to Japanese Patent Application No. 2020-019351 filed on Feb. 7, 2020 and Japanese Patent Application No. 2020-198759 filed on Nov. 30, 2020. Each of the above applications is hereby expressly incorporated by reference, in its entirety, into the present application.

BACKGROUND OF THE INVENTION

1. Field of the Invention

The present invention relates to a standard sample film, a method for producing a standard sample film, a standard sample, a sample set, a quantitative analysis method, and a transfer film.

2. Description of the Related Art

Laser ablation inductively coupled plasma mass spectrometry (hereinafter also referred to as "LA-ICP-MS") is a method in which a sample is irradiated with laser light, fine particles or gas substances generated by explosively peeling a part of the sample are analyzed by inductively coupled plasma mass spectrometry, and quantitative analysis of elements contained in the sample is carried out.

In recent years, a femtosecond laser has been used in the LA-ICP-MS (JP2018-136190A).

SUMMARY OF THE INVENTION

Normally, in the LA-ICP-MS, in order to obtain a concentration of a metal element in a solid sample, it is necessary to create a calibration curve using a solid standard sample in which the concentration of the metal element to be measured is known.

On the other hand, conventionally, an inorganic substance such as glass or metal has been the mainstream as the solid standard sample corresponding to the standard sample in the LA-ICP-MS, and an organic standard sample (a standard sample mainly composed of an organic substance) is limited.

In addition, in a case where a calibration curve of a metal element to be measured is created by using a standard sample in the LA-ICP-MS, and then in a case where the signal intensity of the ion of the metal element to be measured differs depending on the position where the laser light is applied to the standard sample, an appropriate calibration curve cannot be created and the precision and accuracy of the quantitative analysis are lowered. Therefore, it is desirable that the difference in the magnitude of the signal intensity depending on the position where the laser light is applied to the standard sample is small. That is, it is desirable that the variation in signal intensity depending on the measurement position is small.

In addition, in a case where the standard sample can be attached to various materials (an inorganic substance and an organic substance), it is possible to easily prepare a thin film standard substance capable of standardizing a substance for which analysis is requested.

In view of the above circumstances, an object of the first embodiment of the present invention is to provide a standard sample film for use in laser ablation inductively coupled plasma mass spectrometry, which contains an organic substance and has a small variation in signal intensity of an ion of a metal element depending on a measurement position.

In view of the above circumstances, an object of the second embodiment of the present invention is to provide a standard sample for use in laser ablation inductively coupled plasma mass spectrometry, which contains an organic substance and has a small variation in signal intensity of an ion of a metal element depending on a measurement position.

Another object of the present invention is to provide a method for producing a standard sample film, a sample set, a quantitative analysis method, and a transfer film.

As a result of extensive studies on the problems of the related art, the present inventors have found that the foregoing objects can be achieved by the following configurations.

(1) A standard sample film for use in laser ablation inductively coupled plasma mass spectrometry, including a polymer and a metal element, in which a maximum height difference in film thickness of the standard sample film is 0.50 μm or less.

(2) The standard sample film according to (1), in which an element concentration variation of the standard sample film obtained by Method X which will be described later is 30% or less.

(3) The standard sample film according to (1) or (2), in which an average film thickness of the standard sample film is 3.5 μm or less.

(4) The standard sample film according to any one of (1) to (3), in which the metal element is derived from a metal salt of an organic acid or a metal salt of an inorganic acid.

(5) The standard sample film according to any one of (1) to (4), in which the standard sample film contains two or more metal elements.

(6) The standard sample film according to any one of (1) to (5), in which the polymer is a (meth)acrylic polymer.

(7) A method for producing a standard sample film including a step of applying a composition for forming a standard sample film containing a hydrocarbon, a metal salt of an organic acid, a polymer in which an absolute value of a difference from an SP value of the hydrocarbon is 3.5 $MPa^{1/2}$ or less, and a solvent to form a standard sample film.

(8) The method for producing a standard sample film according to (7), in which the organic acid has a hydrocarbon group, and an absolute value of a difference between an SP value of the hydrocarbon group and the SP value of the hydrocarbon is 3.5 $MPa^{1/2}$ or less.

(9) A sample set including a plurality of the standard sample films according to any one of (1) to (6) in combination, in which the plurality of standard sample films contain the same type of metal element, and concentrations of the metal element in the plurality of standard sample films are different from each other.

(10) A quantitative analysis method by laser ablation inductively coupled plasma mass spectrometry, including: a step A of, using a plurality of the standard sample films according to any one of (1) to (6) in which concentrations of the metal element are different from each other, measuring a signal intensity of an ion of the metal element obtained from each of the standard sample films by laser ablation inductively coupled plasma mass spectrometry; a step B of creating a calibration curve based on concentrations of the metal element in the plurality of standard sample films and the signal intensity of the ion of the metal element of each of the plurality of standard sample films obtained in the step A; and a step C of, using a measurement sample containing the same type of metal element as the metal element in the standard sample film, measuring the signal intensity of the ion of the metal element in the measurement sample by laser ablation inductively coupled plasma mass spectrometry, and obtaining a concentration of the metal element in the measurement sample based on the calibration curve.

(11) A transfer film including: a temporary support; and the standard sample film according to any one of (1) to (6) disposed on the temporary support.

(12) A standard sample for use in laser ablation inductively coupled plasma mass spectrometry, including: a hydrocarbon; a metal salt of an organic acid; and a polymer in which an absolute value of a difference from an SP value of the hydrocarbon is 3.5 MPa$^{1/2}$ or less.

(13) The standard sample according to (12), in which in the polymer, an absolute value of the difference from the SP value of the hydrocarbon is 2.5 MPa$^{1/2}$ or less.

(14) The standard sample according to (12) or (13), in which the polymer is a (meth)acrylic polymer.

(15) The standard sample according to any one of (12) to (14), in which the hydrocarbon includes an aliphatic saturated hydrocarbon having 10 or more carbon atoms.

(16) The standard sample according to any one of (12) to (15), in which the hydrocarbon includes paraffin.

(17) The standard sample according to any one of (12) to (16), in which the organic acid has a sulfonic acid group.

(18) The standard sample according to any one of (12) to (17), in which the organic acid has a hydrocarbon group.

(19) The standard sample according to any one of (12) to (18), in which the standard sample contains two or more metal salts of the organic acid having different types of metal elements.

(20) A sample set including a plurality of the standard samples according to any one of (12) to (19) in combination, in which the plurality of standard samples contain the same type of metal salt of an organic acid, and concentrations of a metal element derived from the same type of the metal salt of the organic acid in the plurality of standard samples are different from each other.

(21) A quantitative analysis method by laser ablation inductively coupled plasma mass spectrometry, including: a step 1 of, using a plurality of the standard samples according to any one of (12) to (19) in which concentrations of a metal element derived from the metal salt of the organic acid are different from each other, measuring a signal intensity of an ion of the metal element obtained from each of the standard samples by laser ablation inductively coupled plasma mass spectrometry; a step 2 of creating a calibration curve based on the concentrations of the metal element derived from the metal salt of the organic acid in the plurality of standard samples and the signal intensity of the ion of the metal element of each of the plurality of standard samples obtained in the step 1; and a step 3 of, using a measurement sample containing the same type of metal element as the metal element derived from the metal salt of the organic acid in the standard sample, measuring the signal intensity of the ion of the metal element by laser ablation inductively coupled plasma mass spectrometry, and obtaining a concentration of the metal element in the measurement sample based on the calibration curve.

(22) A transfer film including: a temporary support; and a sample film consisting of the standard sample according to any one of (12) to (19) disposed on the temporary support.

According to the first embodiment of the present invention, it is possible to provide a standard sample film for use in laser ablation inductively coupled plasma mass spectrometry, which contains an organic substance and has a small variation in signal intensity of an ion of a metal element depending on a measurement position.

According to the second embodiment of the present invention, it is possible to provide a standard sample for use in laser ablation inductively coupled plasma mass spectrometry, which contains an organic substance and has a small variation in signal intensity of an ion of a metal element depending on a measurement position.

In addition, according to the aspect of the present invention, it is also possible to provide a method for producing a standard sample film, a sample set, a quantitative analysis method, and a transfer film.

DESCRIPTION OF THE PREFERRED EMBODIMENTS

Figure 1:
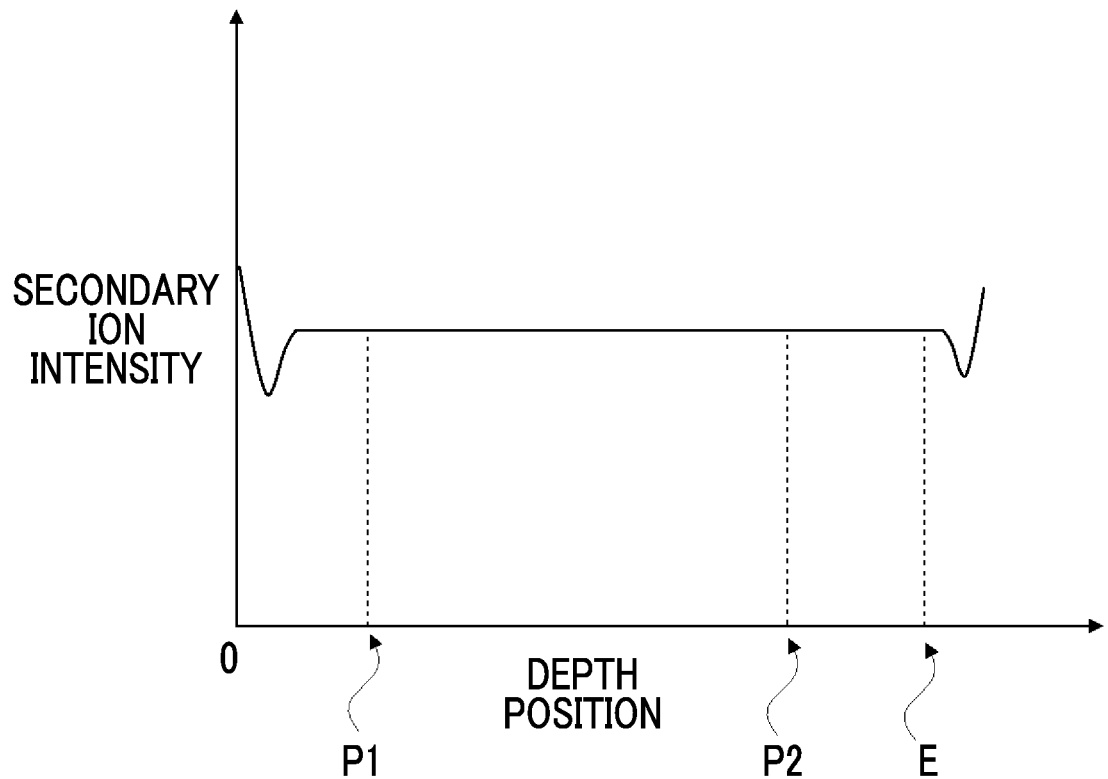
FIG. 1 is a schematic diagram for explaining a depth direction profile of a secondary ion intensity of a metal element detected by analyzing components of a standard sample film in a depth direction by time-of-flight secondary ion mass spectrometry (TOF-SIMS).

Hereinafter, the present invention will be described in more detail. Any numerical range expressed using "to" in the present specification refers to a range including the numerical values before and after the "to" as a lower limit value and an upper limit value, respectively.

First Embodiment

The feature point of the standard sample film according to the first embodiment of the present invention is that a polymer is contained as an organic substance and the maximum height difference of the film thickness of the standard sample film is 0.50 µm or less.

The present inventors have found that the variation in the signal intensity of the ion of the metal element depending on the measurement position is mainly related to the film thickness of the standard sample film. That is, it was found in the standard sample film that, in a case where the maximum height difference of the film thickness is large, the signal intensity of the ion of the metal element tends to be large in the part where the film thickness is thick, and the signal intensity of the ion of the metal element tends to be small in the part where the film thickness is thin, resulting in variation in signal intensity. Therefore, the present inventors have found that the above problem can be solved by adjusting the maximum height difference of the film thickness within a predetermined range.

Examples of the method for reducing the maximum height difference of the film thickness include a method using a predetermined binder (specific polymer and hydrocarbon which will be described later) as described in the second embodiment, a method using a water-soluble polymer and a metal salt of an inorganic acid, and a method using a surfactant.

In the following, first, the standard sample film according to the embodiment of the present invention will be described in detail, and then the method for producing a standard sample film, the sample set, the transfer film, and the quantitative analysis method according to the embodiment of the present invention will be described in detail.

<Standard Sample Film>

The standard sample film according to the embodiment of the present invention is a standard sample film for use in laser ablation inductively coupled plasma mass spectrometry, and contains a polymer and a metal element. The maximum height difference of the film thickness of the standard sample film is 0.50 μm or less.

In the following, first, individual components contained in the standard sample film will be described in detail.

(Polymer)

The type of polymer contained in the standard sample film is not particularly limited, and examples thereof include a water-insoluble polymer and a water-soluble polymer. The water-soluble polymer is a polymer having a dissolution amount of 1 g or more in a case where the polymer is dried at 105° C. for 2 hours and then dissolved in 100 g of water at 25° C. The water-insoluble polymer means a polymer other than the above-mentioned water-soluble polymer.

As will be described later, in a case of preparing the standard sample film, it is preferable to use a water-soluble polymer in a case where water is used, and it is preferable to use a water-insoluble polymer in a case where an organic solvent is used.

Examples of the polymer include a (meth)acrylic polymer, a styrene-based polymer, an olefin-based polymer, a polyester-based polymer, a polyamide-based polymer, and a cellulose-based polymer.

The (meth)acrylic polymer is a general term for an acrylic polymer and a methacrylic polymer.

The (meth)acrylic polymer, styrene-based polymer, olefin-based polymer, polyester-based polymer, polyamide-based polymer, and the like exemplified above are often water-insoluble polymers.

The styrene-based polymer is a polymer containing the largest amount of a repeating unit derived from a styrene in terms of mass ratio among all the repeating units.

From the viewpoint that the variation in signal intensity depending on the measurement position of the standard sample film is further suppressed (hereinafter, also simply referred to as "from the viewpoint that the effect of the present invention is more excellent"), the content of the repeating unit derived from styrene in the styrene-based polymer is preferably 50% by mass or more, more preferably 70% by mass or more, and still more preferably 90% by mass or more with respect to all the repeating units contained in the styrene-based polymer. The upper limit of the content of the repeating unit derived from styrene is not particularly limited, and may be 100% by mass.

The (meth)acrylic polymer is a polymer containing the largest amount of a repeating unit derived from an acrylic acid alkyl ester and/or a methacrylic acid alkyl ester in terms of mass ratio among all the repeating units.

The (meth)acrylic polymer preferably contains a repeating unit derived from a (meth)acrylic acid alkyl ester having an alkyl group having 1 to 14 carbon atoms, from the viewpoint that the effect of the present invention is more excellent.

The number of carbon atoms in the alkyl group of the (meth)acrylic acid alkyl ester is preferably 2 to 14, more preferably 3 to 10, and still more preferably 3 to 8 from the viewpoint that the effect of the present invention is more excellent.

The (meth)acrylic acid alkyl ester is a general term for an acrylic acid alkyl ester and a methacrylic acid alkyl ester.

Examples of the (meth)acrylic acid alkyl ester include methyl (meth)acrylate, ethyl (meth)acrylate, propyl (meth)acrylate, isopropyl (meth)acrylate, n-butyl (meth)acrylate, sec-butyl (meth)acrylate, 1,3-dimethylbutyl acrylate, pentyl (meth)acrylate, isopentyl (meth)acrylate, hexyl (meth)acrylate, 2-ethylbutyl (meth)acrylate, heptyl (meth)acrylate, n-octyl (meth)acrylate, isooctyl (meth)acrylate, 2-ethylhexyl (meth)acrylate, n-nonyl (meth)acrylate, isononyl (meth)acrylate, n-decyl (meth)acrylate, isodecyl (meth) acrylate, n-dodecyl (meth)acrylate, n-tridecyl (meth)acrylate, and n-tetradecyl (meth)acrylate.

From the viewpoint that the effect of the present invention is more excellent, the content of the repeating unit derived from the (meth)acrylic acid alkyl ester having an alkyl group having 1 to 14 carbon atoms in the (meth)acrylic polymer is preferably 50% by mass or more, more preferably 70% by mass or more, and still more preferably 90% by mass or more with respect to all the repeating units contained in the (meth)acrylic polymer. The upper limit of the content of the repeating unit derived from the (meth)acrylic acid alkyl ester having an alkyl group having 1 to 14 carbon atoms is not particularly limited, and may be 100% by mass.

The olefin-based polymer is a polymer containing the largest amount of a repeating unit derived from an olefin in terms of mass ratio among all the repeating units. Examples of the olefin include ethylene and propylene.

The polyester-based polymer is a polymer synthesized by dehydrating and condensing a polyvalent carboxylic acid (dicarboxylic acid) and a polyalcohol (diol) to form an ester bond. Examples of the polyester-based polymer include polyethylene terephthalate, polyethylene naphthalate, and polybutylene terephthalate.

The polyamide-based polymer is a polymer formed by bonding a large number of monomers by an amide bond. Examples of the polyamide-based polymer include nylon 6 and nylon 6,6.

The cellulose-based polymer is a polymer having a cellulose skeleton. Examples of the cellulose-based polymer include diacetyl cellulose and triacetyl cellulose.

The water-soluble polymer is preferably a polymer containing a repeating unit having at least one selected from the group consisting of a structure containing a hydroxyl group, a structure containing a pyrrolidone ring, and a structure containing an oxyalkylene group.

Examples of the water-soluble polymer containing a hydroxyl group include gum arabic, soybean gum, carboxymethyl cellulose, hydroxymethyl cellulose, hydroxyethyl cellulose, polyhydroxyethylated cellulose, hydroxypropyl cellulose, hydroxypropylmethyl cellulose, glyoxalated hydroxypropylmethyl cellulose, hydroxypropylmethyl cellulose phthalate, methyl cellulose, and polyvinyl alcohol.

Examples of the water-soluble polymer containing a pyrrolidone ring include polyvinylpyrrolidone and a copolymer of vinylpyrrolidone and vinyl acetate.

Examples of the water-soluble polymer containing an oxyalkylene group include polyalkylene glycols such as polyethylene glycol and polyoxyethylene polyoxypropylene glycol (also referred to as a polyoxyethylene-polyoxypropylene condensate), and polyoxyalkylene mono-alkyl or aryl ethers such as poly(ethylene glycol) methyl ether and poly(ethylene glycol) phenyl ether.

Above all, the water-soluble polymer is preferably a water-soluble polymer containing a pyrrolidone ring or a polysaccharide, more preferably a water-soluble polymer containing a pyrrolidone ring, and still more preferably polyvinylpyrrolidone.

Examples of the polysaccharide include polysaccharides, polysaccharide derivatives, and alkali metal salts thereof.

The cellulose-based polymer is preferably a compound in which at least a part of the hydroxyl group of cellulose is substituted with at least one selected from the group consisting of an alkyl group and a hydroxyalkyl group.

The content of the polymer in the standard sample film is not particularly limited, and is preferably 40% by mass or more, more preferably 60% by mass or more, still more preferably 80% by mass or more, and particularly preferably 90% by mass or more with respect to the total mass of the standard sample film, from the viewpoint that the effect of the present invention is more excellent. The upper limit of the content of the polymer in the standard sample film is not particularly limited, and is often less than 99% by mass, preferably 98% by mass or less, and more preferably 97% by mass or less.

The polymers may be used alone or in combination of two or more thereof. In a case where two or more polymers are used in combination, the total content of the polymers is preferably in the above range.

(Metal Element)

The metal element is not particularly limited, and examples thereof include known metal elements.

Examples of the metal element include metal elements of Group 1 to Group 12 of the periodic table excluding a hydrogen element, and metal elements of Group 13 to Group 16 of the periodic table. Examples of the metal element belonging to Group 13 of the periodic table include aluminum (Al), gallium (Ga), indium (In), and thallium (Tl). Examples of the metal element belonging to Group 14 of the periodic table include germanium (Ge), tin (Sn), and lead (Pb). Examples of the metal element belonging to Group 15 of the periodic table include antimony (Sb) and bismuth (Bi). Examples of the metal element belonging to Group 16 of the periodic table include polonium (Po).

From the viewpoint that the effect of the present invention is more excellent, aluminum (Al), sodium (Na), magnesium (Mg), barium (Ba), calcium (Ca), titanium (Ti), vanadium (V), chromium (Cr), manganese (Mn), iron (Fe), nickel (Ni), copper (Cu), zinc (Zn), molybdenum (Mo), cadmium (Cd), and lead (Pb) are preferable as the metal element.

The metal element may be ionized in the standard sample film.

The metal elements may be used alone or in combination of two or more thereof.

In a case where two or more different types of metal elements are contained in the standard sample film, the signal intensities of two or more types of metal elements can be obtained by laser ablation inductively coupled plasma mass spectrometry, and therefore a calibration curve for a plurality of metal elements can be created with one standard sample film.

The number of types of metal elements contained in the standard sample film is not particularly limited, and is preferably 2 or more, more preferably 5 or more, still more preferably 10 or more. The upper limit of the number of types of metal elements is not particularly limited, and is often 40 or less.

The content of the metal element in the standard sample film is not particularly limited, and is preferably 0.1 to 1,000 ppm by mass and more preferably 0.1 to 300 ppm by mass with respect to the total mass of the standard sample film, from the viewpoint that the effect of the present invention is more excellent.

In a case where two or more different types of metal elements are used in combination, it is preferable that the concentration of each metal element is within the above range.

The metal element in the standard sample film is preferably derived from a metal salt of an organic acid or a metal salt of an inorganic acid.

That is, by using a metal salt of an organic acid in a case of producing a standard sample film, the standard sample film contains a metal element derived from the metal salt of an organic acid. In other words, in this case, the standard sample film contains the metal salt of an organic acid. The metal salt of an organic acid may be separated into an anion and a cation in the standard sample film.

In addition, by using a metal salt of an inorganic acid in a case of producing a standard sample film, the standard sample film contains a metal element derived from the metal salt of an inorganic acid. In other words, in this case, the standard sample film contains the metal salt of an inorganic acid. The metal salt of an inorganic acid may be separated into an anion and a cation in the standard sample film.

The metal salt of an organic acid is a salt containing an organic acid and a metal element.

Examples of the metal element contained in the metal salt of an organic acid include the above-mentioned metal elements.

Examples of the organic acid include compounds having an acid group selected from the group consisting of a sulfonic acid group, a carboxylic acid group, a phosphoric acid group, a phenolic hydroxyl group, and a thiol group. Above all, a compound having a sulfonic acid group is preferable.

The organic acid preferably has a hydrocarbon group (an aliphatic hydrocarbon group or an aromatic hydrocarbon group), more preferably an aliphatic hydrocarbon group, and still more preferably an alkyl group. The number of carbon atoms in the hydrocarbon group (aliphatic hydrocarbon group or alkyl group) is not particularly limited, and is preferably 5 or more.

The organic acid may have both an aliphatic hydrocarbon group and an aromatic hydrocarbon group.

The organic acid is preferably a hydrocarbon having the above-mentioned acid group and more preferably an alkyl allyl sulfonic acid, from the viewpoint that the effect of the present invention is more excellent.

The metal salt of an inorganic acid is a salt containing inorganic acid and a metal element.

Examples of the metal element contained in the metal salt of an inorganic acid include the above-mentioned metal elements.

Examples of the inorganic acid include hydrochloric acid, nitric acid, sulfuric acid, and phosphoric acid.

(Other Components)

The standard sample film may contain components other than the above-mentioned polymers and metal elements as long as the effects of the present invention are not impaired.

Examples of other components include hydrocarbons.

The type of hydrocarbon is not particularly limited, and examples thereof include known hydrocarbons.

The hydrocarbon may be a saturated hydrocarbon or an unsaturated hydrocarbon, and a saturated hydrocarbon is preferable from the viewpoint that the effect of the present invention is more excellent.

The hydrocarbon may be an aliphatic hydrocarbon or an aromatic hydrocarbon, and an aliphatic hydrocarbon is preferable from the viewpoint that the effect of the present invention is more excellent.

The hydrocarbon may be linear or branched. In addition, the hydrocarbon may have a cyclic structure.

The number of carbon atoms in the hydrocarbon is not particularly limited, and is preferably 5 or more, more preferably 10 or more, still more preferably 15 or more, and particularly preferably 20 or more from the viewpoint that the effect of the present invention is more excellent. The upper limit of the number of carbon atoms in the hydrocarbon is not particularly limited, and is often 40 or less and more often 30 or less.

The hydrocarbon is preferably an aliphatic saturated hydrocarbon, more preferably an aliphatic saturated hydrocarbon having 10 or more carbon atoms, and still more preferably paraffin from the viewpoint that the effect of the present invention is more excellent.

In the present specification, paraffin means an aliphatic saturated hydrocarbon having 15 or more carbon atoms.

The solubility parameter (SP) value of the hydrocarbon is not particularly limited, and is preferably 14 to 18 $MPa^{1/2}$ and more preferably 15 to 17 $MPa^{1/2}$ from the viewpoint that the effect of the present invention is more excellent.

The calculation method of the SP value is as follows.

The molecular structure of each material is input using a calculation program (HSPiP, ver. 4.1.07), and the Hansen solubility parameter (HSP) value ($\delta_D$, $\delta_P$, $\delta_H$) is calculated using the HSP value calculation function attached to the program. Next, the SP value is calculated from the following expression.

$$\text{Expression } SP \text{ value} = (\delta_D^2 + \delta_P^2 + \delta_H^2)^{1/2}$$

The hydrocarbons may be used alone or in combination of two or more thereof.

In a case where the standard sample film contains a metal salt of an organic acid having a hydrocarbon group (in a case where the standard sample film contains a metal element derived from a metal salt of an organic acid), the absolute value of the difference between the SP value of the hydrocarbon group of the organic acid and the SP value of the hydrocarbon is preferably 3.5 $MPa^{1/2}$ or less, more preferably 2.0 $MPa^{1/2}$ or less, and still more preferably 1.0 $MPa^{1/2}$ or less from the viewpoint that the effect of the present invention is more excellent. The lower limit value of the absolute value of the difference is not particularly limited and may be, for example, 0 $MPa^{1/2}$.

The standard sample film may contain a surfactant.

In a case where the standard sample film contains a surfactant, the type of the surfactant is not particularly limited and may be, for example, a known surfactant, examples of which include a hydrocarbon-based surfactant, a fluorine-based and/or a silicon-based surfactant (specifically, a fluorine-based surfactant, a silicon-based surfactant, or a surfactant having both a fluorine atom and a silicon atom), among which a fluorine-based and/or a silicon-based surfactant (specifically, a fluorine-based surfactant, a silicon-based surfactant, or a surfactant having both a fluorine atom and a silicon atom) is preferable.

Including a surfactant in the standard sample film makes it possible to suppress the occurrence of coating defects (cissing, coating streaks, and surface irregularities) in a case where the composition for forming a film is applied to a large area to form a film.

Examples of the hydrocarbon-based surfactant include acetylene-based surfactants OLFINE D-10A, D-10PG, E1004, E1010, E1020, E1030W, PD-001, PD-002W, PD-004, PD-005, EXP. 4001, EXP. 4200, EXP. 4123, EXP. 4300, WE-001, WE-002, and WE-003 (manufactured by Nissin Chemical Co., Ltd.).

Examples of the fluorine-based and/or silicon-based surfactant include the surfactants described in paragraph [0276] of US2008/0248425A.

In addition, surfactants other than the fluorine-based and/or silicon-based surfactant described in paragraph [0280] of US2008/0248425A can also be used.

In addition, for example, MEGAFACE F-251, F-253, F-410, F-477, F-551, F-552, F-553, F-554, F-555, F-556, F-557, F-558, F-559, F-560, F-561, F-562, F-563, F-565, F-568, F-569, F-570, F-572, F-575, F-576, R-40, R-40-LM, and R-41 (manufactured by DIC Corporation), FC4432 (manufactured by Sumitomo 3M Ltd.), SURFLON S-221, S-231, S-232, S-233, S-241, S-242, S-243, S-420, S-431, S-386, S-611, S-647, S-651, S-653, S-656, and S-693 (manufactured by AGC Seimi Chemical Co., Ltd.), PF-136A, PF-156A, and PF-151N (manufactured by OMNOVA Solutions Inc.), and FTERGENT 100, 100C, 150, 150CH, 251, 212M, 215M, 250, 222F, 245F, 208G, DFX-18, 710FL, 710FM, 710FS, 610FM, and 683 (manufactured by Neos Company Limited) can also be used.

These surfactants may be used alone or in combination of two or more thereof.

In a case where the standard sample film contains a surfactant, the content of the surfactant is preferably 0.0001% to 2% by mass and more preferably 0.0005% to 1% by mass with respect to the total solid content of the standard sample film.

(Shape of Standard Sample Film)

The maximum height difference of the film thickness of the standard sample film is 0.50 μm or less and, from the viewpoint that the effect of the present invention is more excellent, is preferably 0.30 μm or less, more preferably 0.20 μm or less, and still more preferably 0.10 μm or less. The lower limit of the maximum height difference is not particularly limited, and is often 0.001 μm or more.

The maximum height difference of the film thickness of the standard sample film is measured by the following method.

The film thickness of the standard sample film is calculated using a stylus type step profiler. The measurement distance is 3 mm and the scanning speed is 0.02 mm/sec. The 3 mm straight line on which the first measurement was carried out is defined as the scanning line 1, and the second measurement is carried out at a position having a distance of 0.2 mm or more in the direction perpendicular to the scanning line 1. After that, the same measurement is repeated to carry out a total of 10 measurements. The maximum value and minimum value of the film thickness in each scan are obtained by carrying out 10 measurements (scans), and the difference (value A-value B) between the largest value A out of the 10 maximum values obtained by 10 scans and the smallest value B out of the 10 minimum values obtained by 10 scans is defined as the maximum height difference of the film thickness.

The average film thickness of the standard sample film is not particularly limited, and is preferably 3.5 µm or less, more preferably 2.5 µm or less, and still more preferably 2.0 µm or less from the viewpoint that the effect of the present invention is more excellent. The lower limit of the average film thickness is not particularly limited, and is preferably 0.05 µm or more and more preferably 0.1 µm or more from the viewpoint of measurement accuracy.

The average film thickness is obtained by measuring the thicknesses of any 20 points with a stylus type step profiler and arithmetically averaging the measured values.

In the standard sample film, the element concentration variation of the standard sample film obtained by the following Method X is preferably 30% or less and more preferably 20% or less from the viewpoint that the effect of the present invention is more excellent. The lower limit of the element concentration variation is not particularly limited, and may be, for example, 0%.

Method X: at 10 points on a surface of the standard sample film, time-of-flight secondary ion mass spectrometry (TOF-SIMS) is carried out from one surface of the standard sample film toward the other surface of the standard sample film to obtain a profile of secondary ion intensity of the metal element in a depth direction, in a case where the position of 20% of a total thickness of the standard sample film from one surface of the standard sample film toward the other surface of the standard sample film is defined as the first position, and the position of 80% of the total thickness of the standard sample film from the one surface of the standard sample film toward the other surface of the standard sample film is defined as the second position, a total value of the secondary ion intensity of the metal element from the first position to the second position at each point is calculated, and then, a relative standard deviation of obtained 10 total values of the secondary ion intensities is calculated and defined as the element concentration variation.

Hereinafter, the foregoing requirements will be described in detail with reference to the accompanying drawings. In the drawings shown below, the scale and the like are described in a form different from the actual data for the sake of making it easier to understand the content of the invention.

FIG. 1 shows an example of a profile obtained by carrying out TOF-SIMS from one surface of a standard sample film toward the other surface of the standard sample film and analyzing the secondary ion intensity of a metal element in the depth direction of the standard sample film (profile of the secondary ion intensity of the metal element in a depth direction). It should be noted that, in the present specification, the depth direction is intended to mean a direction toward the other main surface (thickness direction) with respect to one main surface of the standard sample film having two main surfaces.

Figure 2:
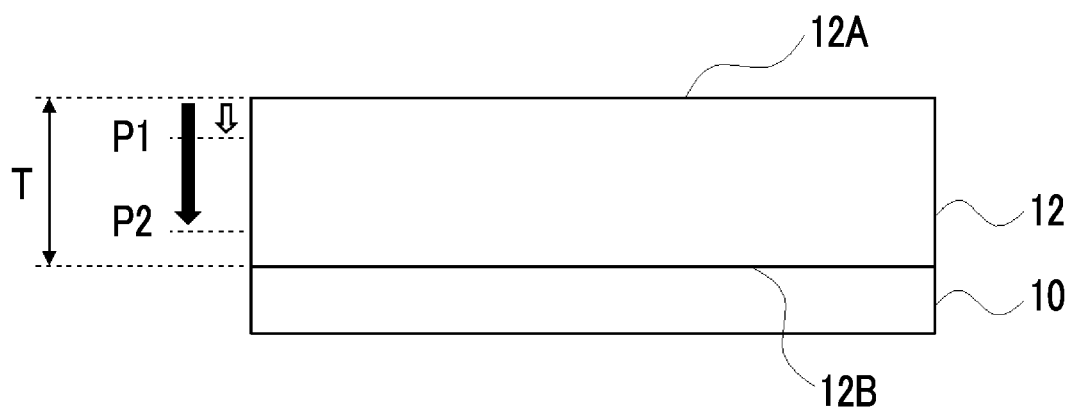
FIG. 2 is a schematic diagram showing an example of a standard sample film to be measured in FIG. 1.

More specifically, the profile in FIG. 1 corresponds to the result of analyzing the components in a depth direction in the standard sample film by TOF-SIMS while ion-sputtering from one surface 12A of a standard sample film 12 disposed on a substrate 10 (the surface of the standard sample film 12 opposite to the substrate 10) toward the other surface 12B of the standard sample film 12 (the surface of the standard sample film 12 on the substrate 10 side), shown in FIG. 2.

In the profile in a depth direction shown in FIG. 1, a lateral axis (an axis extending in a left-right direction of a paper surface in FIG. 1) represents a depth with reference to one surface of the standard sample film, and a vertical axis (an axis extending in a vertical direction of a paper surface in FIG. 1) represents a secondary ion intensity of the metal element.

The TOF-SIMS is specifically described in "Surface Analysis Technology Library Secondary Ion Mass Spectrometry" edited by the Surface Science Society of Japan and published by Maruzen Co., Ltd. (1999).

The position where the lateral axis is zero in FIG. 1 corresponds to the surface 12A of the standard sample film 12, and the position where the lateral axis is E in FIG. 1 corresponds to the surface 12B of the standard sample film 12. That is, zero to E on the lateral axis corresponds to from one surface to the other surface of the standard sample film 12.

In a case where TOF-SIMS is carried out, it is preferable to carry out the TOF-SIMS while irradiating the standard sample film with an ion beam. In a case of analyzing the components of the standard sample film in a depth direction by TOF-SIMS while irradiating the standard sample film with an ion beam, a series of operations are repeated including carrying out the component analysis in a surface depth region of 1 to 2 nm, then digging further in a depth direction from 1 nm to several hundred nm, and carrying out the component analysis in the next surface depth region of 1 to 2 nm.

As shown in FIG. 1 and FIG. 2, the position of 20% of the total thickness of the standard sample film from one surface of the standard sample film toward the other surface of the standard sample film is defined as the first position P1, and the position of 80% of the total thickness of the standard sample film from the one surface of the standard sample film toward the other surface of the standard sample film is defined as the second position P2.

More specifically, as shown by the white arrow in FIG. 2, upon viewing from one surface 12A of the standard sample film 12 toward the other surface 12B of the standard sample film 12, the position where the thickness of 20% of the total thickness T of the standard sample film with reference to the surface 12A is separated is defined as the first position P1. In addition, as shown by the black arrow in FIG. 2, upon viewing from one surface 12A of the standard sample film 12 toward the other surface 12B of the standard sample film 12, the position where the thickness of 80% of the total thickness T of the standard sample film with reference to the surface 12A is separated is defined as the second position P2.

Next, the total value of the secondary ion intensities of the metal element from the first position P1 to the second position P2 is calculated. Specifically, the total value of the secondary ion intensities of the metal element from the first position P1 to the second position P2 shown in FIG. 1 is calculated.

As shown in FIG. 1, in the vicinity of the surface (surface 12A and surface 12B) of the standard sample film, the magnitude of the secondary ion intensity may not be stable due to the influence of surface contamination or the like, and therefore the calculation is carried out excluding the secondary ion intensity in the region from one surface of the standard sample film to the first position P1 and the region from the other surface of the standard sample film to the second position P2.

The operation of calculating the total value of the secondary ion intensities of the metal element is carried out at 10 points on the surface of the standard sample film, and the total value of the secondary ion intensities of the metal element at each measurement point (10 points) is obtained. The relative standard deviation of obtained 10 total values of the secondary ion intensities of the metal element is calculated and defined as the element concentration variation (%).

The size of each measurement point shall be in a range of 100 μm in length×100 μm in width.

In a case of calculating the relative standard deviation, first, the standard deviation calculated from the obtained 10 total values of the secondary ion intensities of the metal element and the arithmetic mean value of the obtained 10 total values of the secondary ion intensities of the metal element are obtained. The ratio (%) of the standard deviation to the obtained arithmetic mean value [(standard deviation/arithmetic mean value)×100] is obtained and defined as the element concentration variation.

In a case where the standard sample film contains a plurality of types of metal elements, it is preferable that the element concentration variation of at least one metal element is within a predetermined range, and it is more preferable that the element concentration variation of each metal element is within a predetermined range. That is, it is more preferable that the element concentration variation of all types of metal elements contained in the standard sample film is within a predetermined range.

(Method for Producing Standard Sample Film)

The method for producing the standard sample film is not particularly limited as long as a standard sample film exhibiting the above-mentioned characteristics can be produced. For example, in a case where a metal salt of an organic acid is used, there is a method having a step of preparing a composition for forming a standard sample film containing a polymer (in particular, a water-insoluble polymer), a metal salt of an organic acid, other components used as needed (for example, a hydrocarbon and a surfactant), and an organic solvent, and applying the obtained composition for forming a standard sample film onto a substrate to form a standard sample film. In addition, in a case where a metal salt of an inorganic acid is used, there is a method having a step of preparing a composition for forming a standard sample film containing a polymer (in particular, a water-soluble polymer), a metal salt of an inorganic acid, other components used as needed (for example, a surfactant), and water or an aqueous solution containing an inorganic acid, and applying the obtained composition for forming a standard sample film onto a substrate to form a standard sample film. That is, there is a method having a step of applying a composition for forming a standard sample film containing at least a polymer, a source of a metal element, and a solvent onto a substrate to form a standard sample film.

Above all, from the viewpoint that a standard sample film having an excellent effect of the present invention can be produced with high productivity, a method for producing a standard sample film having a step of applying a composition for forming a standard sample film containing a hydrocarbon, a metal salt of an organic acid, a polymer in which an absolute value of a difference from an SP value of the hydrocarbon is 3.5 MPa$^{1/2}$ or less, and a solvent to form a standard sample film is preferable.

The hydrocarbon and the metal salt of an organic acid are as described above.

A polymer in which an absolute value of the difference from the SP value of the hydrocarbon is 3.5 MPa$^{1/2}$ or less (hereinafter, also simply referred to as "specific polymer") has good compatibility with the hydrocarbon.

The absolute value of the difference between the SP value of the specific polymer and the SP value of the hydrocarbon is preferably 2.5 MPa$^{1/2}$ or less, more preferably 2.0 MPa$^{1/2}$ or less, particularly preferably 1.5 MPa$^{1/2}$ or less, and most preferably 1.0 MPa$^{1/2}$ or less from the viewpoint that the effect of the present invention is more excellent. The lower limit of the absolute value of the difference is not particularly limited and is preferably zero.

The SP value of the specific polymer may satisfy the range of the absolute value of the above difference, and is preferably 15 to 19 MPa$^{1/2}$ and more preferably 16 to 17 MPa$^{1/2}$ from the viewpoint that the effect of the present invention is more excellent.

In a case where the specific polymer contains a plurality of repeating units, a product of a SP value of each repeating unit and a molar ratio of the repeating unit to all the repeating units is calculated and totaled to calculate the SP value of the specific polymer. For example, in a case where the specific polymer contains a repeating unit A of SP$^A$ and a repeating unit B of SP$^B$, the molar ratio of the repeating unit A to all the repeating units is 0.2, and the molar ratio of the repeating unit B to all the repeating units is 0.8, the SP value of the specific polymer is calculated as follows.

$$SP \text{ value of specific polymer}=(SP^A \times 0.2)+(SP^B \times 0.8)$$

The type of the specific polymer is not particularly limited as long as it satisfies the range of the absolute value of the above difference.

Examples of the specific polymer include a (meth)acrylic polymer, a styrene-based polymer, an olefin-based polymer, a polyester-based polymer, and a polyamide-based polymer, among which a (meth)acrylic polymer or a styrene-based polymer is preferable, and a (meth)acrylic polymer is more preferable.

Details of each polymer are as described in the polymer contained in the standard sample film.

It is preferable that the content of the specific polymer contained in the composition for forming a standard sample film is adjusted so as to be the content of the polymer in the standard sample film described above.

It is preferable that the content of the metal salt of an organic acid contained in the composition for forming a standard sample film is adjusted so as to be the content of the metal element in the standard sample film described above.

The content of the hydrocarbon contained in the composition for forming a standard sample film is preferably 1% to 60% by mass, more preferably 1% to 40% by mass, still more preferably 1% to 20% by mass, and particularly preferably 1% to 10% by mass with respect to the total amount of the specific polymer, the metal salt of an organic acid, and the hydrocarbon, from the viewpoint that the effect of the present invention is more excellent.

The solvent contained in the composition for forming a standard sample film may be any solvent that can dissolve the above-mentioned various components. Examples of the solvent include an organic solvent and water, among which an organic solvent is preferable. Examples of the organic solvent include a ketone-based solvent, an alcohol-based solvent, an ether-based solvent, a hydrocarbon-based solvent, and an ester-based solvent, among which a ketone-based solvent or an ester-based solvent is preferable.

Specific examples of the solvent include methyl ethyl ketone, butyl acetate, toluene, hexane, acetone, and chloroform.

The concentration of the solvent in the composition for forming a standard sample film is not particularly limited, and the content of the solvent with respect to the total mass of the composition is preferably 60% to 99% by mass and more preferably 70% to 99% by mass from the viewpoint that a film having high thickness uniformity can be obtained.

The method for applying the composition for forming a standard sample film onto a substrate is not particularly limited, and examples thereof include known methods (for example, a spin coating method, a dip coating method, and an ink jet method).

The type of the substrate is not particularly limited, and examples thereof include quartz, a glass substrate, and a silicon wafer from the viewpoint of excellent flatness.

After applying the composition for forming a standard sample film onto the substrate, a drying treatment may be carried out to remove the solvent in the coating film, if necessary. Examples of the drying treatment method include a heat treatment. Hydrocarbons may be volatilized and removed during the drying treatment.

The substrate may be a temporary support.

In a case where the substrate is a temporary support, a transfer film having the temporary support and the standard sample film disposed on the temporary support is formed. By bringing the standard sample film on the temporary support of this transfer film into contact with a transfer target material and peeling off the temporary support, the standard sample film can be disposed on the transfer target material. Using such a transfer film makes it possible to dispose the standard sample film on transfer target materials of various shapes.

Examples of the temporary support include a support whose surface is treated with a release agent (for example, a silicone-based release agent), and a support which itself has a peel property.

The temporary support is preferably a polymer substrate.

Examples of the material constituting the temporary support include a cellulose-based polymer, a (meth)acrylic polymer, a styrene-based polymer, an olefin-based polymer, a polyester-based polymer, and a polyamide-based polymer.

The water contact angle on the side of the temporary support on which the standard sample film is disposed is not particularly limited, and is preferably 100 degrees or more from the viewpoint that the transferability of the standard sample film is more excellent.

Examples of the method for measuring the water contact angle include the static drop method described in JIS R 3257: 1999. Specifically, the water contact angle is a water contact angle measured using a contact angle meter FTA1000 (FTA 32 software) (manufactured by First Ten Angstroms, Inc.) under the conditions of room temperature of 25° C. and humidity of 50%. More specifically, the water contact angle is a value calculated from the equation of $\theta=2$ arctan (h/r) for the water contact angle $\theta$ by determining the radius r and the height h for the liquid droplets of pure water on the surface of the temporary support, in a case where 1.5 µl of pure water is dropped on the surface of the temporary support kept horizontal and 30 seconds have passed.

<Sample Set>

The sample set of the first embodiment of the present invention is a set in which a plurality of standard sample films are combined. The plurality of standard sample films contain the same type of metal element, and the concentrations of the same type of metal element in the plurality of standard sample films are different from each other.

In laser ablation inductively coupled plasma mass spectrometry, usually, a calibration curve showing the relationship between a concentration and a signal intensity of a predetermined metal element to be measured is created by using a plurality of standard sample films in which concentrations of the same type of metal element are different from each other. That is, a calibration curve can be easily created by using the above sample set.

The number of standard sample films in the sample set is not particularly limited, and it is preferable to contain 2 or more standard sample films in which concentrations of a metal element are different from each other, and more preferably 5 or more standard sample films in which concentrations of the metal element are different from each other. The upper limit of the number of standard sample films in the sample set is not particularly limited, and is often 10 or less.

<Quantitative Analysis Method>

By using the standard sample film according to the embodiment of the present invention, it is possible to analyze the content of the metal element contained in a measurement sample whose content of the metal element is unknown.

In the quantitative analysis method of the first embodiment of the present invention, a known laser ablation inductively coupled plasma mass spectrometer can be used. Above all, it is preferable to use a femtosecond laser ablation inductively coupled plasma mass spectrometer. Examples of the device include a Jupiter solid nebulizer (manufactured by ST Japan, Inc.).

The laser ablation inductively coupled plasma mass spectrometer used in the first embodiment is the same as the laser ablation inductively coupled plasma mass spectrometer used in the second embodiment which will be described later. Details of the device will be described in the second embodiment.

The quantitative analysis method includes steps A to C which will be described later.

Step A: a step of, using a plurality of the standard sample films according to the embodiment of the present invention in which concentrations of the metal element are different from each other, measuring a signal intensity of an ion of the metal element obtained from each of the standard sample films by laser ablation inductively coupled plasma mass spectrometry Step B: a step of creating a calibration curve based on concentrations of the metal element in the plurality of standard sample films and the signal intensity of the ion of the metal element of each of the plurality of standard sample films obtained in the step A Step C: a step of, using a measurement sample containing the same type of metal element as the metal element in the standard sample film, measuring the signal intensity of the ion of the metal element in the measurement sample by laser ablation inductively coupled plasma mass spectrometry, and obtaining a concentration of the metal element in the measurement sample based on the calibration curve Hereinafter, the procedure of each step will be described in detail.

(Step A)

The step A is a step of, using a plurality of the standard sample films according to the embodiment of the present invention in which concentrations of the metal element are different from each other, measuring a signal intensity of an ion of the metal element obtained from each of the standard sample films by laser ablation inductively coupled plasma mass spectrometry. In the present step, a standard sample film having a known concentration of a metal element is used, and the signal intensity obtained from the standard sample film is measured.

As described above, in the present step A, the signal intensity is measured using a known laser ablation inductively coupled plasma mass spectrometer.

In the step A, a plurality of positions (points) of the standard sample film are irradiated with laser light, the signal intensities of the ion of the metal element at each position are measured, and the obtained signal intensities are arithmetically averaged. The obtained average signal intensity may be used as the signal intensity obtained from the standard sample film.

Figure 3:
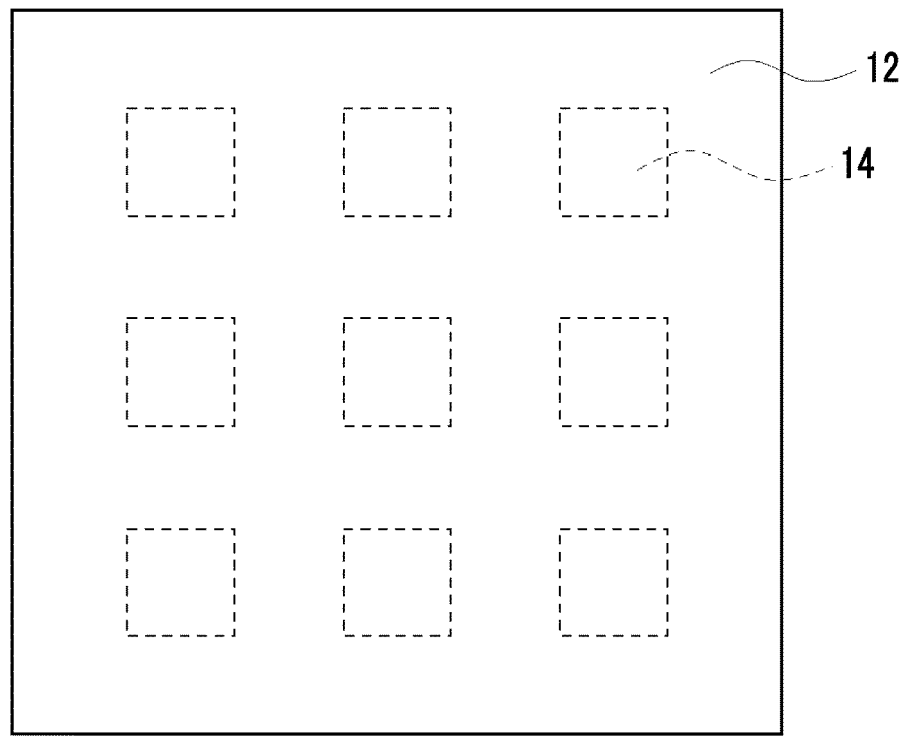
FIG. 3 is a schematic diagram for explaining a procedure for irradiating a standard sample film with laser light.

More specifically, as shown in FIG. 3, each of a plurality of regions 14 in the standard sample film 12 is irradiated with laser light. The number of regions 14 in FIG. 3 is 9 points, but the number is not particularly limited. Usually, the number of regions 14 is often 5 to 20 points.

The size of the region 14 is not particularly limited, and is often 0.1 to 1.0 mm in length and 0.1 to 1.0 mm in width.

The distance between the regions 14 is not particularly limited, and the regions 14 are usually spaced from each other by about the length of one side of the region 14.

The method of irradiating the standard sample film with laser light is not particularly limited.

The wavelength of the laser light for irradiation is not particularly limited, and is preferably 200 to 300 nm and more preferably 230 to 260 nm from the viewpoint that the effect of the present invention is more excellent.

The intensity of the laser light for irradiation is not particularly limited, and is preferably 1.0 to 2.0 $J/cm^2$ and more preferably 1.2 to 1.8 $J/cm^2$ from the viewpoint that the effect of the present invention is more excellent.

The pulse width of the laser light for irradiation is not particularly limited, and is preferably 200 to 300 fs and more preferably 230 to 250 fs from the viewpoint that the effect of the present invention is more excellent.

The frequency of the laser light for irradiation is not particularly limited, and is preferably 5,000 to 20,000 Hz and more preferably 8,000 to 12,000 Hz from the viewpoint that the effect of the present invention is more excellent.

The irradiation time of the laser light is not particularly limited, and is preferably 0.5 to 3.0 seconds and more preferably 1.5 to 2.5 seconds from the viewpoint that the effect of the present invention is more excellent.

The number of standard sample films in which concentrations of the metal element are different from each other used in the step A is not particularly limited, and the number of standard sample films required for measuring the calibration curve is appropriately selected.

The number of standard sample films in which concentrations of the metal element are different from each other is preferably 2 or more, more preferably 5 to 20, and still more preferably 5 to 10 from the viewpoint of further improving the accuracy of quantitative analysis. That is, it is preferable to obtain at least 2 or more (preferably 5 to 20 and more preferably 5 to 10) data of the concentration of the metal element in the standard sample film and the signal intensity at that concentration.

Carrying out the step A makes it possible to obtain data on the signal intensity of an ion of a metal element to be measured based on the concentration from a plurality of standard sample films in which concentrations of a metal element are different from each other. That is, the data on signal intensity corresponding to the concentration of the metal element can be obtained for each concentration of the metal element.

In a case where a plurality of types of metal elements are contained in the standard sample film (in a case where a plurality of metal salts of an organic acid having different types of metal elements are contained), the signal intensities of ions corresponding to the concentrations of the respective types of metal elements may be obtained in the present step A.

(Step B)

The step B is a step of creating a calibration curve based on concentrations of the metal element in the plurality of standard sample films and the signal intensity of the ion of the metal element of each of the plurality of standard sample films obtained in the step A.

Figure 4:
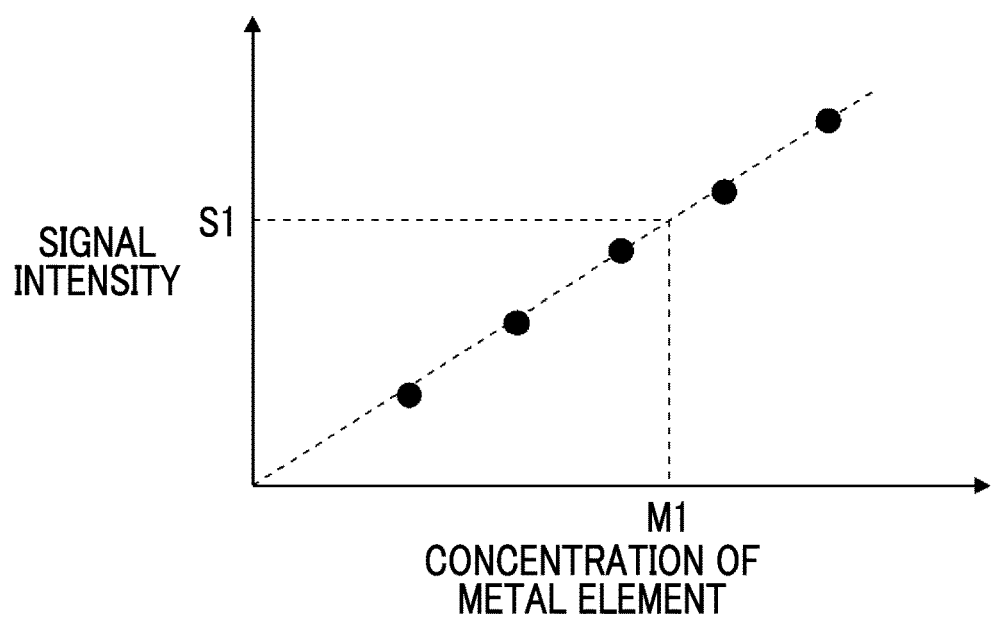
FIG. 4 is a schematic diagram of a calibration curve based on the concentration and signal intensity of a metal element.

As described above, in the step A, signal intensity data based on the concentration can be obtained from a plurality of standard sample films in which concentrations of a metal element are different from each other. In the present step B, a calibration curve is created using the concentration of the metal element and the signal intensity of the ion of the metal element based on the concentration. More specifically, for example, as shown in FIG. 4, the points for the concentration of the metal element in each standard sample film and the signal intensity of the ion of the metal element are plotted (corresponding to the black dots in FIG. 4) on the orthogonal coordinates with the concentration of the metal element on the lateral axis and the signal intensity of the ion of the metal element on the vertical axis to create a calibration curve (broken line in FIG. 4) passing through the plotted points. In a case of drawing a calibration curve, for example, a method of drawing a calibration curve (regression line) based on the least squares method can be mentioned.

In FIG. 4, 5 plot points are described, but the number of plot points is not limited to FIG. 4.

(Step C)

The step C is a step of, using a measurement sample containing the same type of metal element as the metal element in the standard sample film, measuring the signal intensity of the ion of the metal element by laser ablation inductively coupled plasma mass spectrometry, and obtaining a concentration of the metal element in the measurement sample based on the calibration curve. In the present step C, laser ablation inductively coupled plasma mass spectrometry is applied to a measurement sample whose metal element concentration is unknown, the signal intensity of the ion of the metal element is measured, the signal intensity of the ion of the metal element in the measurement sample and the corresponding concentration of the metal element are read from the calibration curve, and the concentration of the detected metal element in the measurement sample is obtained.

More specifically, as shown in FIG. 4, in a case where the signal intensity of the ion of the metal element of the measurement sample whose metal element concentration is unknown obtained in the step C is S1, it can be quantified that the concentration of the metal element in the measurement sample is M1 by reading the concentration M1 of the metal element corresponding to the signal intensity S1 from the calibration curve.

In a case where the measurement sample contains a plurality of metal elements, the concentration of each metal element in the measurement sample can be quantified based on the calibration curve corresponding to each metal element.

Second Embodiment

A feature point of the standard sample of the second embodiment of the present invention is that a metal salt of an organic acid and a predetermined binder (a hydrocarbon and a predetermined polymer) are used.

The variation in the signal intensity of the ion of the metal element depending on the measurement position is mainly related to the uniformity of the distribution of the metal element in the standard sample. That is, in a case where the metal salt of the organic acid is unevenly distributed in the standard sample, the signal intensity differs greatly between the position where the metal salt of the organic acid is present and the position where the metal acid of the organic acid is not present. The present inventors have found that a metal salt of an organic acid can be uniformly dispersed in a standard sample by using a predetermined binder and as a result, a desired effect can be obtained.

It should be noted that the standard substance of the present invention can be applied to various materials. That is, the standard substance of the present invention can be used for elemental analysis in a wide range of material fields including an inorganic substance and an organic substance.

In the following, first, the standard sample according to the embodiment of the present invention will be described in detail, and then the sample set, the transfer film, and the quantitative analysis method according to the embodiment of the present invention will be described in detail.

<Standard Sample>

The standard sample according to the embodiment of the present invention is a standard sample used for laser ablation inductively coupled plasma mass spectrometry, and contains a hydrocarbon, a metal salt of an organic acid, and a polymer in which an absolute value of a difference from a solubility parameter (SP) value of the hydrocarbon is 3.5 MPa$^{1/2}$ or less.

In the following, individual components contained in the standard sample will be described in detail.

(Hydrocarbon)

The type of hydrocarbon is not particularly limited, and examples thereof include known hydrocarbons.

The hydrocarbon may be a saturated hydrocarbon or an unsaturated hydrocarbon, and a saturated hydrocarbon is preferable from the viewpoint that the effect of the present invention is more excellent.

The hydrocarbon may be an aliphatic hydrocarbon or an aromatic hydrocarbon, and an aliphatic hydrocarbon is preferable from the viewpoint that the effect of the present invention is more excellent.

The hydrocarbon may be linear or branched. In addition, the hydrocarbon may have a cyclic structure.

The number of carbon atoms in the hydrocarbon is not particularly limited, and is preferably 5 or more, more preferably 10 or more, still more preferably 15 or more, and particularly preferably 20 or more from the viewpoint that the effect of the present invention is more excellent. The upper limit of the number of carbon atoms in the hydrocarbon is not particularly limited, and is often 40 or less and more often 30 or less.

The hydrocarbon is preferably an aliphatic saturated hydrocarbon, more preferably an aliphatic saturated hydrocarbon having 10 or more carbon atoms, and still more preferably paraffin from the viewpoint that the effect of the present invention is more excellent.

In the present specification, paraffin means an aliphatic saturated hydrocarbon having 15 or more carbon atoms.

The SP value of the hydrocarbon is not particularly limited, and is preferably 14 to 18 MPa$^{1/2}$ and more preferably 15 to 17 MPa$^{1/2}$ from the viewpoint that the effect of the present invention is more excellent.

The calculation method of the SP value is as follows.

The molecular structure of each material is input using a calculation program (HSPiP, ver. 4.1.07), and the Hansen solubility parameter (HSP) value ($\delta_D$, $\delta_P$, $\delta_H$) is calculated using the HSP value calculation function attached to the program. Next, the SP value is calculated from the following expression.

$$\text{Expression } SP \text{ value} = (\delta_D^2 + \delta_P^2 + \delta_H^2)^{1/2}$$

The content of the hydrocarbon in the standard sample is not particularly limited, and is preferably 1% to 60% by mass, more preferably 1% to 40%, still more preferably 1% to 20% by mass, and particularly preferably 1% to 10% by mass is by mass with respect to the total mass of the standard sample, from the viewpoint that the effect of the present invention is more excellent.

The hydrocarbons may be used alone or in combination of two or more thereof. In a case where two or more hydrocarbons are used in combination, the total content of the hydrocarbons is preferably in the above range.

(Metal Salt of Organic Acid)

The metal salt of an organic acid is a salt containing an organic acid and a metal element.

Examples of the organic acid include compounds having an acid group selected from the group consisting of a sulfonic acid group, a carboxylic acid group, a phosphoric acid group, a phenolic hydroxyl group, and a thiol group. Above all, a compound having a sulfonic acid group is preferable.

The organic acid preferably has a hydrocarbon group (an aliphatic hydrocarbon group or an aromatic hydrocarbon group), more preferably an aliphatic hydrocarbon group, and still more preferably an alkyl group. The number of carbon atoms in the hydrocarbon group (aliphatic hydrocarbon group or alkyl group) is not particularly limited, and is preferably 5 or more.

The organic acid may have both an aliphatic hydrocarbon group and an aromatic hydrocarbon group.

The organic acid is preferably a hydrocarbon having the above-mentioned acid group and more preferably an alkyl allyl sulfonic acid, from the viewpoint that the effect of the present invention is more excellent.

In addition, the absolute value of the difference between the SP value of the hydrocarbon group of the organic acid and the SP value of the hydrocarbon is preferably 3.5 MPa$^{1/2}$ or less, more preferably 2.0 MPa$^{1/2}$ or less, and still more preferably 1.0 MPa$^{1/2}$ or less from the viewpoint that the effect of the present invention is more excellent. The lower limit value of the absolute value of the difference is not particularly limited and may be, for example, 0 MPa$^{1/2}$.

The metal element of the metal salt is not particularly limited, and examples thereof include known metal elements. Examples of the metal element include metal elements of Group 1 to Group 12 of the periodic table excluding a hydrogen element, and metal elements of Group 13 to Group 16 of the periodic table. Examples of the metal element belonging to Group 13 of the periodic table include aluminum (Al), gallium (Ga), indium (In), and thallium (Tl). Examples of the metal element belonging to Group 14 of the periodic table include germanium (Ge), tin (Sn), and lead (Pb). Examples of the metal element belonging to Group 15 of the periodic table include antimony (Sb) and bismuth (Bi). Examples of the metal element belonging to Group 16 of the periodic table include polonium (Po).

From the viewpoint that the effect of the present invention is more excellent, aluminum (Al), sodium (Na), magnesium (Mg), barium (Ba), calcium (Ca), titanium (Ti), vanadium (V), chromium (Cr), manganese (Mn), iron (Fe), nickel (Ni), copper (Cu), zinc (Zn), molybdenum (Mo), cadmium (Cd), and lead (Pb) are preferable as the metal element.

The content of the metal salt of the organic acid in the standard sample is not particularly limited, and the concentration of the metal element derived from the metal salt of the organic acid is preferably 0.1 to 1,000 ppm by mass and more preferably 0.1 to 300 ppm by mass with respect to the total mass of the standard sample, from the viewpoint that the effect of the present invention is more excellent.

The concentration of the metal element derived from the metal salt of the organic acid in the standard sample means the concentration of the metal element contained in the metal salt of the organic acid in the standard sample.

The metal salts of the organic acid may be used alone or in combination of two or more thereof. In a case where two or more types of metal salts of an organic acid having different types of metal elements are used in combination, it is preferable that the concentration of the metal element derived from each of the metal salts of the organic acid is within the above range.

As described above, in a case where two or more types of metal salts of an organic acid are used, it is preferable to use two or more types of metal salts of the organic acid having different types of metal elements.

In a case where two or more types of metal salts of an organic acid having different types of metal elements are contained in the standard sample, the signal intensities of two or more types of metal elements can be obtained by laser ablation inductively coupled plasma mass spectrometry, and therefore a calibration curve for a plurality of metal elements can be created with one standard sample.

The number of types of metal salts of an organic acid having different types of metal elements contained in the standard sample is not particularly limited, and is preferably 2 or more, more preferably 5 or more, and still more preferably 10 or more. The upper limit of the number of types of metal salts of an organic acid having different types of metal elements is not particularly limited, and is often 40 or less.

(Polymer in which absolute value of difference from SP value of hydrocarbon is 3.5 MPa$^{1/2}$ or less)

A polymer in which an absolute value of the difference from the SP value of the hydrocarbon is 3.5 MPa$^{1/2}$ or less (hereinafter, also simply referred to as "specific polymer") has good compatibility with the hydrocarbon.

The absolute value of the difference between the SP value of the specific polymer and the SP value of the hydrocarbon is preferably 2.5 MPa$^{1/2}$ or less, more preferably 2.0 MPa$^{1/2}$ or less, particularly preferably 1.5 MPa$^{1/2}$ or less, and most preferably 1.0 MPa$^{1/2}$ or less from the viewpoint that the effect of the present invention is more excellent. The lower limit of the absolute value of the difference is not particularly limited and is preferably zero.

The SP value of the specific polymer may satisfy the range of the absolute value of the above difference, and is preferably 15 to 19 MPa$^{1/2}$ and more preferably 16 to 17 MPa$^{1/2}$ from the viewpoint that the effect of the present invention is more excellent.

The calculation method of the SP value is as follows.

The molecular structure of each material (structure of the repeating unit in the specific polymer) is input using a calculation program (HSPiP, ver. 4.1.07), and the Hansen solubility parameter (HSP) value ($\delta_D$, $\delta_P$, $\delta_H$) is calculated using the HSP value calculation function attached to the program. Next, the SP value is calculated from the following expression.

$$\text{Expression } SP \text{ value} = (\delta_D^2 + \delta_P^2 + \delta_H^2)^{1/2}$$

In a case where the specific polymer contains a plurality of repeating units, a product of a SP value of each repeating unit and a molar ratio of the repeating unit to all the repeating units is calculated and totaled to calculate the SP value of the specific polymer. For example, in a case where the specific polymer contains a repeating unit A of SP$^A$ and a repeating unit B of SP$^B$, the molar ratio of the repeating unit A to all the repeating units is 0.2, and the molar ratio of the repeating unit B to all the repeating units is 0.8, the SP value of the specific polymer is calculated as follows.

$$SP \text{ value of specific polymer} = (SP^A \times 0.2) + (SP^B \times 0.8)$$

The type of the specific polymer is not particularly limited as long as it satisfies the range of the absolute value of the above difference.

Examples of the specific polymer include a (meth)acrylic polymer, a styrene-based polymer, an olefin-based polymer, a polyester-based polymer, and a polyamide-based polymer, among which a (meth)acrylic polymer or a styrene-based polymer is preferable, and a (meth)acrylic polymer is more preferable.

The (meth)acrylic polymer is a general term for an acrylic polymer and a methacrylic polymer.

The styrene-based polymer is a polymer containing the largest amount of a repeating unit derived from a styrene in terms of mass ratio among all the repeating units.

From the viewpoint that the effect of the present invention is more excellent, the content of the repeating unit derived from styrene in the styrene-based polymer is preferably 50% by mass or more, more preferably 70% by mass or more, and still more preferably 90% by mass or more with respect to all the repeating units contained in the styrene-based polymer. The upper limit of the content of the repeating unit derived from styrene is not particularly limited, and may be 100% by mass.

The (meth)acrylic polymer is a polymer containing the largest amount of a repeating unit derived from an acrylic acid alkyl ester and/or a methacrylic acid alkyl ester in terms of mass ratio among all the repeating units.

The (meth)acrylic polymer preferably contains a repeating unit derived from a (meth)acrylic acid alkyl ester having an alkyl group having 1 to 14 carbon atoms, from the viewpoint that the effect of the present invention is more excellent.

The number of carbon atoms in the alkyl group of the (meth)acrylic acid alkyl ester is preferably 2 to 14, more preferably 3 to 10, and still more preferably 3 to 8 from the viewpoint that the effect of the present invention is more excellent.

The (meth)acrylic acid alkyl ester is a general term for an acrylic acid alkyl ester and a methacrylic acid alkyl ester.

Examples of the (meth)acrylic acid alkyl ester include methyl (meth)acrylate, ethyl (meth)acrylate, propyl (meth)acrylate, isopropyl (meth)acrylate, n-butyl (meth)acrylate, sec-butyl (meth)acrylate, 1,3-dimethylbutyl acrylate, pentyl (meth)acrylate, isopentyl (meth)acrylate, hexyl (meth)acrylate, 2-ethylbutyl (meth)acrylate, heptyl (meth)acrylate, n-octyl (meth)acrylate, isooctyl (meth)acrylate, 2-ethylhexyl (meth)acrylate, n-nonyl (meth)acrylate, isononyl (meth)acrylate, n-decyl (meth)acrylate, isodecyl (meth) acrylate, n-dodecyl (meth)acrylate, n-tridecyl (meth)acrylate, and n-tetradecyl (meth)acrylate.

From the viewpoint that the effect of the present invention is more excellent, the content of the repeating unit derived from the (meth)acrylic acid alkyl ester having an alkyl group having 1 to 14 carbon atoms in the (meth)acrylic polymer is preferably 50% by mass or more, more preferably 70% by mass or more, and still more preferably 90% by mass or more with respect to all the repeating units contained in the (meth)acrylic polymer. The upper limit of the content of the repeating unit derived from styrene is not particularly limited, and may be 100% by mass.

The olefin-based polymer is a polymer containing the largest amount of a repeating unit derived from an olefin in terms of mass ratio among all the repeating units. Examples of the olefin include ethylene and propylene.

The polyester-based polymer is a polymer synthesized by dehydrating and condensing a polyvalent carboxylic acid (dicarboxylic acid) and a polyalcohol (diol) to form an ester bond. Examples of the polyester-based polymer include polyethylene terephthalate, polyethylene naphthalate, and polybutylene terephthalate.

The polyamide-based polymer is a polymer formed by bonding a large number of monomers by an amide bond. Examples of the polyamide-based polymer include nylon 6 and nylon 6,6.

The content of the specific polymer in the standard sample is not particularly limited, and is preferably 40% by mass or more, more preferably 60% by mass or more, still more preferably 80% by mass or more, and particularly preferably 90% by mass or more with respect to the total mass of the standard sample, from the viewpoint that the effect of the present invention is more excellent. The upper limit of the content of the specific polymer in the standard sample is not particularly limited, but it is often less than 99% by mass, preferably 98% by mass or less, and more preferably 97% by mass or less.

The specific polymers may be used alone or in combination of two or more thereof. In a case where two or more specific polymers are used in combination, the total content of the specific polymers is preferably in the above range.

The standard sample may contain other components other than the above-mentioned hydrocarbon, metal salt of organic acid, and specific polymer as long as the effects of the present invention are not impaired.

Other components include a solvent.

The content of other components in the standard sample is preferably 5% by mass or less and more preferably 1% by mass or less with respect to the total mass of the standard sample. The lower limit of the content of other components is not limited, and may be, for example, 0% by mass.

The method for producing the standard sample is not particularly limited, and examples thereof include a method of mixing the above-mentioned various components (hydrocarbon, metal salt of organic acid, and specific polymer). Examples of the method of mixing include a method of adding various components to a solvent, mixing and stirring the components, and removing the solvent.

The shape of the standard sample is not particularly limited and may be in the form of a film or a lump. In particular, the shape of the standard sample is preferably in the form of a film from the viewpoint that it is easy to carry out measurement. In a case where the standard sample according to the embodiment of the present invention is in the form of a film, the surface flatness of the obtained film is excellent.

In a case where the standard sample is in the form of a film, the average film thickness of the sample film consisting of the standard sample is not particularly limited, and is preferably 0.1 to 10 µm, more preferably 0.5 to 5 µm, and still more preferably 0.5 to 3.5 µm from the viewpoint that the effect of the present invention is more excellent.

The average film thickness is obtained by measuring the thicknesses of any 20 points of the sample film consisting of the standard sample using a stylus type step profiler and arithmetically averaging the measured values.

The method for producing the sample film consisting of the standard sample is not particularly limited, and examples thereof include a method of mixing a solvent and the above-mentioned various components (hydrocarbon, metal salt of organic acid, and specific polymer) to prepare a composition, applying the obtained composition onto a substrate, and carrying out a drying treatment, if necessary.

The type of solvent used is not particularly limited, and any solvent may be used as long as it can dissolve the above-mentioned various components. Examples of the solvent include an organic solvent and water, among which an organic solvent is preferable. Examples of the organic solvent include a ketone-based solvent, an alcohol-based solvent, an ether-based solvent, a hydrocarbon-based solvent, and an ester-based solvent, among which a ketone-based solvent or an ester-based solvent is preferable.

Specific examples of the solvent include methyl ethyl ketone, butyl acetate, toluene, hexane, acetone, and chloroform.

The concentration of the solvent in the composition is not particularly limited, and the content of the solvent with respect to the total mass of the composition is preferably 60% to 99% by mass and more preferably 70 to 99% by mass from the viewpoint that a film having high thickness uniformity can be obtained.

The method for applying the composition onto a substrate is not particularly limited, and examples thereof include known methods (for example, a spin coating method, a dip coating method, and an ink jet method).

The type of the substrate is not particularly limited, and examples thereof include quartz, a glass substrate, and a silicon wafer from the viewpoint of excellent flatness.

After applying the composition onto the substrate, a drying treatment may be carried out to remove the solvent in the coating film, if necessary. Examples of the drying treatment method include a heat treatment.

The substrate may be a temporary support.

In a case where the substrate is a temporary support, a transfer film having the temporary support and the sample film consisting of the standard sample disposed on the temporary support is formed. By bringing the sample film on the temporary support of this transfer film into contact with a transfer target material and peeling off the temporary support, the sample film can be disposed on the transfer target material. Using such a transfer film makes it possible to dispose the sample film on transfer target materials of various shapes.

Examples of the temporary support include a support whose surface is treated with a release agent (for example, a silicone-based release agent), and a support which itself has a peel property.

The temporary support is preferably a polymer substrate.

Examples of the material constituting the temporary support include a cellulose-based polymer, a (meth)acrylic polymer, a styrene-based polymer, an olefin-based polymer, a polyester-based polymer, and a polyamide-based polymer.

The water contact angle on the side of the temporary support on which the sample film consisting of the standard sample is disposed is not particularly limited, and is preferably 100 degrees or more from the viewpoint that the transferability of the sample film is more excellent.

Examples of the method for measuring the water contact angle include the static drop method described in JIS R 3257: 1999. Specifically, the water contact angle is a water contact angle measured using a contact angle meter FTA1000 (FTA 32 software) (manufactured by First Ten Angstroms, Inc.) under the conditions of room temperature of 25° C. and humidity of 50%. More specifically, the water contact angle is a value calculated from the equation of $\theta=2$ arctan (h/r) for the water contact angle $\theta$ by determining the radius r and the height h for the liquid droplets of pure water on the surface of the temporary support, in a case where 1.5 µl of pure water is dropped on the surface of the temporary support kept horizontal and 30 seconds have passed.

<Sample Set>

The sample set of the second embodiment of the present invention is a set in which a plurality of standard samples are combined. The plurality of standard samples contain the same type of metal salt of an organic acid, and the concentrations of the same type of metal salt of the organic acid in the plurality of standard samples are different from each other.

In laser ablation inductively coupled plasma mass spectrometry, usually, a calibration curve showing the relationship between the concentration and the signal intensity of a predetermined metal element to be measured is created by using a plurality of standard samples in which concentrations of the same type of metal salt of an organic acid are different from each other. That is, a calibration curve can be easily created by using the above sample set.

The number of standard samples in the sample set is not particularly limited, and it is preferable to contain 2 or more standard samples in which concentrations of a metal salt of an organic acid are different from each other, and more preferably 5 or more standard samples in which concentrations of a metal salt of an organic acid are different from each other. The upper limit of the number of standard sample films in the sample set is not particularly limited, and is often 10 or less.

<Quantitative Analysis Method>

By using the standard sample according to the embodiment of the present invention, it is possible to analyze the content of the metal element contained in a measurement sample whose content of the metal element is unknown.

In the quantitative analysis method of the second embodiment of the present invention, a known laser ablation inductively coupled plasma mass spectrometer can be used. Above all, it is preferable to use a femtosecond laser ablation inductively coupled plasma mass spectrometer. Examples of the device include a Jupiter solid nebulizer (manufactured by ST Japan, Inc.).

The laser ablation inductively coupled plasma mass spectrometer usually includes a laser ablation unit (hereinafter, also simply referred to as "LA unit") and an inductively coupled plasma mass spectrometry unit (hereinafter, also simply referred to as "ICP-MS unit").

The LA unit is a unit that irradiates a sample with a laser to carry out laser ablation. The structure of the LA unit is not particularly limited, and adopts a known structure and usually has a stage for placing a sample and a laser irradiation unit. A carrier gas consisting of a rare gas such as helium (He) or argon (Ar) is introduced into the LA unit, and the fine particles or gaseous substances generated by the irradiation with laser light are transported to the ICP-MS unit.

Normally, the LA unit and the ICP-MS unit communicate with each other through a pipe line.

In the ICP-MS unit, an atomic species and a concentration thereof are measured by ionizing an object to be measured transported from the LA unit by high-temperature plasma maintained by high-frequency electromagnetic induction and detecting the ions with a mass spectrometer.

The structure of the ICP-MS unit is not particularly limited, and adopts a known structure. Normally, the ICP-MS unit often has a plasma torch that generates plasma that ionizes a sample introduced together with a carrier gas, and a mass spectrometry unit located near a tip part of the plasma torch.

The quantitative analysis method includes steps 1 to 3 which will be described later.

Step 1: a step of, using a plurality of the standard samples according to the embodiment of the present invention in which concentrations of a metal element derived from the metal salt of the organic acid are different from each other, measuring a signal intensity of an ion of the metal element obtained from each of the standard samples by laser ablation inductively coupled plasma mass spectrometry Step 2: a step of creating a calibration curve based on the concentrations of the metal element derived from the metal salt of the organic acid in the plurality of standard samples and the signal intensity of the ion of the metal element of each of the plurality of standard samples obtained in the step 1

Step 3: a step of, using a measurement sample containing the same type of metal element as the metal element derived from the metal salt of the organic acid in the standard sample, measuring the signal intensity of the ion of the metal element by laser ablation inductively coupled plasma mass spectrometry, and obtaining a concentration of the metal element in the measurement sample based on the calibration curve Hereinafter, the procedure of each step will be described in detail.

(Step 1)

The step 1 is a step of, using a plurality of the standard samples according to the embodiment of the present invention in which concentrations of a metal element derived from the metal salt of the organic acid are different from each other, measuring a signal intensity of an ion of the metal element obtained from each of the standard samples by laser ablation inductively coupled plasma mass spectrometry. In the present step, a standard sample having a known concentration of a metal element derived from a metal salt of an organic acid is used, and the signal intensity obtained from the standard sample is measured.

As described above, in the present step 1, the signal intensity is measured using a known laser ablation inductively coupled plasma mass spectrometer.

In the step 1, a plurality of positions (points) of the standard sample are irradiated with laser light, the signal intensities of the ion of the metal element at each position are measured, and the obtained signal intensities are arithmetically averaged. The obtained average signal intensity may be used as the signal intensity obtained from the standard sample.

Figure 5:
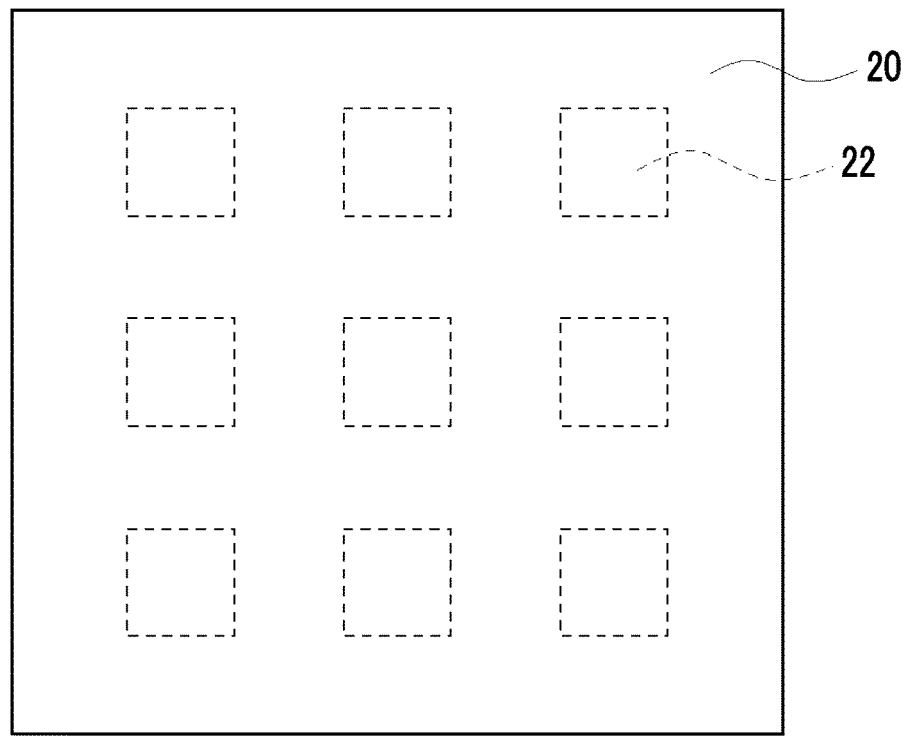
FIG. 5 is a schematic diagram for explaining a procedure for irradiating a standard sample with laser light.

More specifically, as shown in FIG. 5, each of a plurality of regions 22 in a standard sample 20 is irradiated with laser light. The number of regions 22 in FIG. 5 is 9 points, but the number is not particularly limited. Usually, the number of regions 22 is often 5 to 20 points.

The size of the region 22 is not particularly limited, and is often 0.1 to 1.0 mm in length and 0.1 to 1.0 mm in width.

The distance between the regions 22 is not particularly limited, and the regions 22 are usually spaced from each other by about the length of one side of the region 22.

The method of irradiating the standard sample with laser light is not particularly limited.

The wavelength of the laser light for irradiation is not particularly limited, and is preferably 200 to 300 nm and more preferably 230 to 260 nm from the viewpoint that the effect of the present invention is more excellent.

The intensity of the laser light for irradiation is not particularly limited, and is preferably 1.0 to 2.0 J/cm$^2$ and more preferably 1.2 to 1.8 J/cm$^2$ from the viewpoint that the effect of the present invention is more excellent.

The pulse width of the laser light for irradiation is not particularly limited, and is preferably 200 to 300 fs and more preferably 230 to 250 fs from the viewpoint that the effect of the present invention is more excellent.

The frequency of the laser light for irradiation is not particularly limited, and is preferably 5,000 to 20,000 Hz and more preferably 8,000 to 12,000 Hz from the viewpoint that the effect of the present invention is more excellent.

The irradiation time of the laser light is not particularly limited, and is preferably 0.5 to 3.0 seconds and more preferably 1.5 to 2.5 seconds from the viewpoint that the effect of the present invention is more excellent.

The number of standard samples in which concentrations of a metal element derived from the metal salt of the organic acid are different from each other used in the step 1 is not particularly limited, and the number of standard samples required for measuring the calibration curve is appropriately selected.

The number of standard samples in which concentrations of the metal element derived from the metal salt of the organic acid are different from each other is preferably 2 or more, more preferably 5 to 20, and still more preferably 5 to 10 from the viewpoint of further improving the accuracy of quantitative analysis. That is, it is preferable to obtain at least 2 or more (preferably 5 to 20 and more preferably 5 to 10) data of the concentration of the metal element in the standard sample and the signal intensity at that concentration.

Carrying out the step 1 makes it possible to obtain data on the signal intensity of an ion of a metal element to be measured based on the concentration from a plurality of standard samples in which concentrations of a metal element are different from each other. That is, the data on signal intensity corresponding to the concentration of the metal element can be obtained for each concentration of the metal element.

In a case where a plurality of types of metal elements are contained in the standard sample (in a case where a plurality of metal salts of an organic acid having different types of metal elements are contained), the signal intensities of ions corresponding to the concentrations of the respective types of metal elements may be obtained in the present step 1.

(Step 2)

The step 2 is a step of creating a calibration curve based on the concentrations of the metal element derived from the metal salt of the organic acid in the plurality of standard samples and the signal intensity of the ion of the metal element of each of the plurality of standard samples obtained in the step 1.

Figure 6:
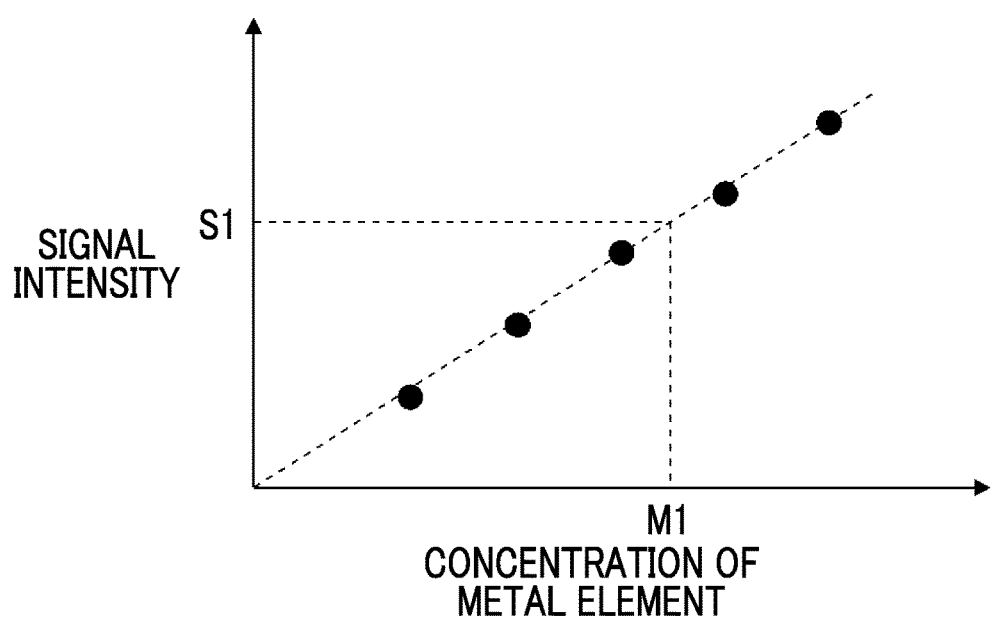
FIG. 6 is a schematic diagram of a calibration curve based on the concentration and signal intensity of a metal element.

As described above, in the step 1, signal intensity data based on the concentration can be obtained from a plurality of standard samples in which concentrations of a metal element are different from each other. In the present step 2, a calibration curve is created using the concentration of the metal element and the signal intensity of the ion of the metal element based on the concentration. More specifically, for example, as shown in FIG. 6, the points for the concentration of the metal element in each standard sample and the signal intensity of the ion of the metal element are plotted (corresponding to the black dots in FIG. 6) on the orthogonal coordinates with the concentration of the metal element on the lateral axis and the signal intensity of the ion of the metal element on the vertical axis to create a calibration curve (broken line in FIG. 6) passing through the plotted points. In a case of drawing a calibration curve, for example, a method of drawing a calibration curve (regression line) based on the least squares method can be mentioned.

In FIG. 6, 5 plot points are described, but the number of plot points is not limited to FIG. 6.

(Step 3)

The step 3 is a step of, using a measurement sample containing the same type of metal element as the metal element derived from a metal salt of an organic acid in the standard sample, measuring the signal intensity of the ion of the metal element by laser ablation inductively coupled plasma mass spectrometry, and obtaining a concentration of the metal element in the measurement sample based on the calibration curve. In the present step, laser ablation inductively coupled plasma mass spectrometry is applied to a measurement sample whose metal element concentration is unknown, the signal intensity of the ion of the metal element is measured, the signal intensity of the ion of the metal element in the measurement sample and the corresponding concentration of the metal element are read from the calibration curve, and the concentration of the detected metal element in the measurement sample is obtained.

More specifically, as shown in FIG. 6, in a case where the signal intensity of the ion of the metal element of the measurement sample whose metal element concentration is unknown obtained in the step 3 is S1, it can be quantified that the concentration of the metal element in the measurement sample is M1 by reading the concentration M1 of the metal element corresponding to the signal intensity S1 from the calibration curve.

In a case where the measurement sample contains a plurality of metal elements, the concentration of each metal element in the measurement sample can be quantified based on the calibration curve corresponding to each metal element.

EXAMPLES

Hereinafter, features of the present invention will be described in more detail with reference to Examples and Comparative Examples. The materials, amounts used, proportions, treatment details, treatment procedure, and the like shown in the following Examples can be appropriately changed without departing from the spirit and scope of the present invention. Accordingly, the scope of the present invention should not be construed as being limited by the specific examples given below.

Example A

Example A1

Polybutyl methacrylate and a metal dispersion liquid (CONOSTAN STD, manufactured by SCP Science Inc.) were added to methyl ethyl ketone and dissolved to obtain a solution. The concentration of polybutyl methacrylate was 10% by mass with respect to the total mass of the solution. In addition, the metal dispersion liquid contained a plurality of alkylallyl sulfonates having different types of metals (SP value of hydrocarbon group: 16 MPa$^{1/2}$) and paraffin (SP value: 16 MPa$^{1/2}$). The metal dispersion liquid was added so that the concentration of an aluminum element in the standard sample which will be described later was 40 ppm by mass. The metal dispersion liquid contained the same amount of sodium element, magnesium element, calcium element, titanium element, vanadium element, chromium element, manganese element, iron element, nickel element, copper element, zinc element, molybdenum element, cadmium element, barium element, and lead element as that of the aluminum element.

The difference between the SP value of the hydrocarbon group contained in the alkylallyl sulfonate and the SP value of paraffin was 0 MPa$^{1/2}$.

The obtained solution was spin-coated (rotation speed: 2,000 rpm, time: 20 seconds) on synthetic quartz (2.5 cm in length×2.5 cm in width×0.7 mm in thickness) to prepare a film-like standard sample on the synthetic quartz. The content of paraffin with respect to the total mass of the standard sample was 8% by mass, and the content of polybutyl methacrylate with respect to the total mass of the standard sample was the remainder other than the paraffin and the components derived from the metal dispersion liquid (for example, alkylallyl sulfonate).

Femtosecond laser ablation inductively coupled plasma mass spectrometry was carried out using the obtained film-like standard sample.

The femtosecond laser ablation device used was a Jupiter solid nebulizer (manufactured by ST Japan, Inc.).

The various conditions were as follows.
Laser conditions
Laser device: LPS MultiProbe
Laser wavelength: 260 nm
Laser power (fluence): 0.5 to 1.5 J/cm$^2$
Laser pulse width: 247 fs
Laser frequency: 10,000 Hz
Irradiation time: approximately 2 seconds
Carrier gas: He gas added at rate of 0.6 L/min in sample chamber and Ar gas added at rate of 1.1 L/min immediately after sample chamber
Irradiation range: 1 mm in length×1 mm in width ICP-MS conditions
MS measuring device: iCAP TQ (available from Thermo Fisher Scientific Inc.)
RF power: 1,550 W
Cooling gas flow rate: 14 L/min
Auxiliary gas flow rate: 0.8 L/min As shown in FIG. 3 and FIG. 5, laser ablation was carried out on nine regions (size of each region: 1 mm in length×1 mm in width) of the film-like standard sample (standard sample film) to gasify the sample. The distance between the regions was 1 mm.

After obtaining signal intensities corresponding to the nine regions, the average value (average signal intensity) and the standard deviation of the signal intensities were obtained, and further, the relative standard deviation of the signal intensities was obtained.

The relative standard deviations of the signal intensities shown in Table 1 which will be described later are the worst value obtained by obtaining the relative standard deviations for all the metal elements contained in the standard sample.

In addition, before the measurement of laser ablation, the maximum height difference of the film thickness of the prepared standard sample was calculated using a stylus type step profiler.

The method for measuring the maximum height difference of the film thickness is as follows.

The film thickness of the standard sample film was calculated using a stylus type step profiler. The measurement distance was 3 mm and the scanning speed was 0.02 mm/sec. The 3 mm straight line on which the first measurement was carried out was defined as the scanning line 1, and the second measurement was carried out at a position having a distance of 0.2 mm or more in the direction perpendicular to the scanning line 1. After that, the same measurement was repeated to carry out a total of 10 measurements. The maximum value and minimum value of the film thickness in each scan were obtained by carrying out 10 measurements (scans), and the difference (value A-value B) between the largest value A out of the 10 maximum values obtained by 10 scans and the smallest value B out of the 10 minimum values obtained by 10 scans was defined as the maximum height difference of the film thickness.

Examples A2 and A3 and Comparative Example A1

The relative standard deviation of the signal intensity was obtained in the same manner as in Example A1, except that the type of polymer used was changed as shown in Table 1 which will be described later.

For the film-like standard sample (standard sample film) obtained in each of Examples and Comparative Examples, the above-mentioned Method X was carried out to calculate the element concentration variation (%) of the metal element contained in the standard sample film.

In Table 1, "PBMA" represents polybutyl methacrylate, "PMMA" represents polymethyl methacrylate, "PS" represents polystyrene, and "PVBC" represents polyvinyl benzyl chloride.

In Table 1, "Na concentration variation (%)" represents an element concentration variation (%) of the Na element calculated by the above-mentioned Method X, and "Mg concentration variation (%)" represents an element concentration variation (%) of the Mg element calculated by the above-mentioned Method X.

TABLE 1

| | Type of polymer | Absolute value of difference of SP value from paraffin (MPa$^{1/2}$) | Relative standard deviation of signal intensity (%) | Maximum height difference of film thickness (μm) | Average film thickness (μm) | Na Concentration variation (%) | Mg Concentration variation (%) |
|---|---|---|---|---|---|---|---|
| Example A1 | PBMA | 0.7 | 3 | 0.08 | 0.5 | 5 | 5 |
| Example A2 | PMMA | 1.2 | 10 | 0.12 | 0.5 | 8 | 8 |
| Example A3 | PS | 2.9 | 40 | 0.42 | 2.4 | 26 | 26 |
| Comparative Example A1 | PVBC | 4.1 | 200 | 2 | 5.3 | 125 | 125 |

As shown in Table 1, it was confirmed that the relative standard deviation of the signal intensity was small in a case where the standard sample according to the embodiment of the present invention was used. That is, it was confirmed that the variation in the signal intensity of the metal element depending on the measurement position was small.

Above all, from the comparison of Examples A1 to A3, it was confirmed that the effect was more excellent in a case where the absolute value of the difference from the hydrocarbon (paraffin) is 2.5 MPa$^{1/2}$ or less (preferably 1.0 MPa$^{1/2}$ or less).

Example 2A

Polyvinylpyrrolidone (PVP) and a NaCl standard solution (for atomic absorption, manufactured by Kanto Chemical Co., Inc.) were added to water and dissolved to obtain a solution. The concentration of polyvinylpyrrolidone was 6% by mass with respect to the total mass of the solution. The NaCl standard solution was added such that the concentration of the Na element in the standard sample was 40 ppm by mass.

The obtained solution was spin-coated (rotation speed: 1,000 rpm, time: 20 seconds) on a quartz substrate (2.5 cm in length×2.5 cm in width×1.0 mm in thickness), followed by baking on a hot plate at 200° C. for 5 minutes to prepare a film-like standard sample (standard sample film) on the quartz substrate.

Using the obtained standard sample film, various evaluations were carried out in the same manner as in Example A1 above. The results are shown in Table 2.

It should be noted that PVP corresponds to a water-soluble polymer.

TABLE 2

| | Type of polymer | Relative standard deviation of signal intensity (%) | Maximum height difference of film thickness (μm) | Average film thickness (μm) | Na Concentration variation (%) |
|---|---|---|---|---|---|
| Example 2A | PVP | 5 | 0.05 | 0.3 | 5 |

As shown in Table 2, it was confirmed that the relative standard deviation of the signal intensity was small in a case where the standard sample (standard sample film) according to the embodiment of the present invention was used. That is, it was confirmed that the variation in the intensity of the metal element depending on the measurement position was small.

Example 3A

Polybutyl methacrylate, a metal dispersion liquid (CONOSTAN STD, manufactured by SCP Science Inc.), and a surfactant (MEGAFACE R-41, manufactured by DIC Corporation) were added to butyl acetate and dissolved to obtain a solution. The concentration of polybutyl methacrylate was 6% by mass with respect to the total mass of the solution, and the concentration of the surfactant was 0.05% by mass with respect to the total mass of the solution. The metal dispersion liquid was added such that the concentration of the aluminum element in the standard sample was 100 ppm by mass.

The obtained solution was spin-coated on a disk-shaped silicon wafer (4.0 inch in diameter×0.5 mm in thickness), followed by baking on a hot plate at 200° C. for 5 minutes to prepare a film-like standard sample (standard sample film) on the silicon wafer.

A test piece of the standard sample film having a length of 2.5 cm and a width of 2.5 cm was cut out from a certain place in the silicon wafer, and the obtained test piece was evaluated. The results are shown in Table 3.

TABLE 3

| | Relative standard deviation of signal intensity (%) | Maximum height difference of film thickness (μm) | Average film thickness (μm) |
|---|---|---|---|
| Example 3A | 5 | 0.05 | 0.5 |

As shown in Table 3, it was confirmed that the relative standard deviation of the signal intensity was small in a case where the standard sample (standard sample film) according to the embodiment of the present invention was used. That is, it was confirmed that the variation in the intensity of the metal element depending on the measurement position was small.

Example B

The signal intensity at each concentration of each metal element ($^{23}$Na, $^{25}$Mg, $^{27}$Al, $^{43}$Ca, $^{49}$Ti, $^{51}$V, $^{53}$Cr, $^{55}$Mn, $^{57}$Fe, $^{60}$Ni, $^{65}$Cu, $^{66}$Zn, $^{95}$Mo, $^{111}$Cd, $^{137}$Ba, and $^{208}$Pb) was obtained in the same manner as in Example A1, except that the amount of the metal dispersion liquid added was adjusted such that the contents of sodium element, magnesium element, aluminum element, calcium element, titanium element, vanadium element, chromium element, manganese element, iron element, nickel element, copper element, zinc element, molybdenum element, cadmium element, barium element, and lead element with respect to the total mass of the standard sample were 0 ppm by mass, 23 ppm by mass, 41 ppm by mass, 60 ppm by mass, 76 ppm by mass, 109 ppm by mass, 164 ppm by mass, and 201 ppm by mass, respectively. As described in Example A above, in Example B as well, nine regions of one standard sample were irradiated with laser light, and the average value of the obtained signal intensities was used as the signal intensity shown in Tables 4 to 6. The results are shown in Tables 4 to 6.

In addition, the points for the concentration of each metal element and the signal intensity of the ion of the metal element were plotted on the orthogonal coordinates with the concentration of each metal element on the lateral axis and the signal intensity of the ion of the metal element on the vertical axis, a calibration curve passing through the plotted points was created by the least squares method, and the coefficient of determination was calculated. In Tables 4 to 6, "Calibration curve" represents a linear function of the created calibration curve, and "Coefficient of determination ($R^2$)" represents a coefficient of determination obtained by the least squares method. The coefficient of determination closer to 1.000 corresponds to the better results.

Figure 7:
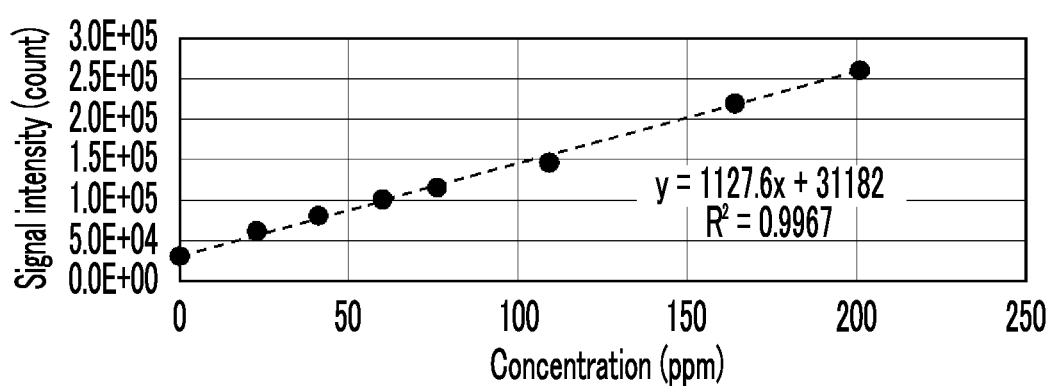
FIG. 7 is a diagram of a calibration curve in a case of $^{43}$Ca.

As a representative example, FIG. 7 shows the results in a case of $^{43}$Ca.

The metal dispersion liquid (CONOSTAN STD, manufactured by SCP Science Inc.) contained sodium alkylsulfonate, magnesium alkylallylsulfonate, aluminum alkylallylsulfonate, calcium alkylallylsulfonate, titanium alkylallylsulfonate, vanadium alkylallylsulfonate, chromium alkylallylsulfonate, manganese alkylallylsulfonate, iron alkylallylsulfonate, nickel alkylallylsulfonate, copper alkylallylsulfonate, zinc alkylallylsulfonate, molybdenum alkylallylsulfonate, cadmium alkylallylsulfonate, barium alkylallylsulfonate, and lead alkylallylsulfonate. In addition, the concentration of each of the metal salts of the organic acid in the metal dispersion liquid was 0.01% by mass in terms of each metal element. That is, for example, magnesium alkylallylsulfonate was contained such that the amount of the magnesium element in the metal dispersion liquid was 0.01% by mass.

TABLE 4

| Metal element concentration (ppm by mass) | $^{23}$Na | $^{25}$Mg | $^{27}$Al | $^{43}$Ca | $^{49}$TI | $^{51}$V |
|---|---|---|---|---|---|---|
| 0 | 1.05E+06 | 8.10E+04 | 5.10E+05 | 3.00E+04 | 5.50E+05 | 2.50E+04 |
| 23 | 1.71E+07 | 1.40E+06 | 2.50E+07 | 6.10E+04 | 1.20E+06 | 1.20E+07 |
| 41 | 2.96E+07 | 2.00E+06 | 2.90E+07 | 8.00E+04 | 1.60E+06 | 1.90E+07 |
| 60 | 3.51E+07 | 2.70E+06 | 4.40E+07 | 1.00E+05 | 2.20E+06 | 2.90E+07 |
| 76 | 5.40E+07 | 3.30E+06 | 5.10E+07 | 1.10E+05 | 2.70E+06 | 3.80E+07 |
| 109 | 7.69E+07 | 4.20E+06 | 5.70E+07 | 1.40E+C5 | 3.50E+06 | 5.20E+07 |
| 164 | 1.15E+08 | 7.30E+06 | 8.40E+07 | 2.20E+05 | 5.70E+06 | 9.00E+07 |
| 201 | 1.41E+08 | 9.40E+06 | 1.00E+08 | 2.60E+05 | 6.90E+06 | 1.10E+08 |
| Calibration curve | y = 701769x − 377698 | y = 43449x + 262924 | y = 455462x + (1E+07) | y = 1127x + 31182 | Y = 31778x + 373649 | y = 555299x − (3E+06) |
| Coefficient of determination ($R^2$) | 0.999 | 0.993 | 0.972 | 0.997 | 0.995 | 0.995 |

TABLE 5

| Metal element concentration (ppm by mass) | $^{53}$Cr | $^{55}$Mn | $^{57}$Fe | $^{60}$Ni | $^{65}$Cu |
|---|---|---|---|---|---|
| 0 | 1.50E+04 | 6.80E+04 | 1.80E+04 | 2.60E+04 | 1.90E+04 |
| 23 | 1.10E+06 | 1.70E+07 | 3.30E+05 | 2.10E+06 | 2.50E+06 |
| 41 | 1.90E+06 | 2.70E+07 | 5.10E+05 | 3.30E+06 | 3.90E+06 |
| 60 | 2.80E+06 | 4.10E+07 | 7.70E+05 | 5.10E+06 | 6.10E+06 |
| 76 | 3.60E+06 | 5.20E+07 | 9.80E+05 | 6.50E+06 | 7.90E+06 |
| 109 | 4.80E+06 | 7.00E+07 | 1.30E+06 | 8.40E+06 | 9.80E+06 |
| 164 | 8.30E+06 | 1.20E+08 | 2.20E+06 | 1.50E+07 | 1.70E+07 |
| 201 | 1.00E+07 | 1.60E+08 | 2.80E+06 | 1.90E+07 | 2.10E+07 |
| Calibration curve | y = 51361x − 211464 | y = 763352x − (4E+06) | y = 13551x − 35950 | y = 92166x − 383213 | y = 104247 − 226238 |
| Coefficient of determination ($R^2$) | 0.994 | 0.992 | 0.993 | 0.992 | 0.993 |

TABLE 6

| Metal element concentration (ppm by mass) | $^{66}$Zn | $^{95}$Mo | $^{111}$Cd | $^{137}$Ba | $^{208}$Pb |
|---|---|---|---|---|---|
| 0 | 6.60E+04 | 1.90E+05 | 1.70E+02 | 1.00E+04 | 1.40E+06 |
| 23 | 2.50E+06 | 3.30E+06 | 1.50E+06 | 4.40E+06 | 3.60E+07 |
| 41 | 4.00E+06 | 5.20E+06 | 2.30E+06 | 7.00E+06 | 5.20E+07 |
| 60 | 6.20E+06 | 7.80E+06 | 3.70E+06 | 1.10E+07 | 7.70E+07 |
| 76 | 7.90E+06 | 1.10E+07 | 4.80E+06 | 1.50E+07 | 9.90E+07 |
| 109 | 9.30E+06 | 1.50E+07 | 6.00E+06 | 1.90E+07 | 1.30E+08 |
| 164 | 1.60E+07 | 2.60E+07 | 1.10E+07 | 3.30E+07 | 2.20E+08 |
| 201 | 2.20E+07 | 3.20E+07 | 1.60E+07 | 4.00E+07 | 2.80E+08 |
| Calibration curve | y = 103969x − 224529 | y = 161132x − (1E+06) | y = 75540x − 704452 | y = 203069x − (1E+06) | y = (1E+06)x − (2E+06) |
| Coefficient of determination ($R^2$) | 0.987 | 0.993 | 0.976 | 0.995 | 0.994 |

As shown in Tables 4 to 6, the linearity of the calibration curve obtained for any of the metal elements was excellent, and good results were obtained.

By using the above calibration curve, laser ablation inductively coupled plasma mass spectrometry can be carried out on a measurement sample whose concentration of metal element is unknown, and the metal element can be quantified from the obtained signal intensity.

Example C

Example C1

In the same manner as in Example A1, polybutyl methacrylate and a metal dispersion liquid (CONOSTAN STD, manufactured by SCP Science Inc.) were added to methyl ethyl ketone and dissolved to obtain a solution. The metal dispersion liquid was added such that the concentration of the aluminum element in the standard sample was 40 ppm by mass.

The obtained solution was spin-coated (rotation speed: 2,000 rpm, time: 20 seconds) on a polypropylene film (2.5 cm in length×2.5 cm in width×0.01 mm in thickness) to prepare a film-like standard sample (standard sample film) on the polypropylene film (hereinafter, referred to as a temporary support). The content of paraffin with respect to the total mass of the standard sample film was 8% by mass, and the content of polybutyl methacrylate with respect to the total mass of the standard sample film was the remainder other than the paraffin and the components derived from the metal dispersion liquid (for example, alkylallyl sulfonate).

The average film thickness of the obtained standard sample film on the temporary support was calculated using a stylus type step profiler.

The surface of the obtained standard sample film on the temporary support was pressed against the silicon wafer, which was held for 1 minute. The pressure at the time of pressing was about 50 g/cm$^2$, and the environment was normal temperature and normal humidity.

The percentage of the area of the standard sample film transferred to the silicon wafer side after peeling the temporary support was calculated with the area of the standard sample film on the temporary support as 100%. In addition, the average film thickness of the standard sample film transferred to the silicon wafer side was calculated using a stylus type step profiler.

Example C2

A standard sample film was prepared and pressed against a silicon wafer in the same manner as in Example C1, except that the type of the temporary support onto which the solution was applied was changed as shown in Table 7 which will be described later. The thickness of the polyethylene terephthalate film (Example C2) was 0.01 mm.

The water contact angle of the temporary support used was measured according to the method described above.

In Table 7, "Transferred area (%)" represents the percentage of the area of the standard sample film transferred to the silicon wafer side in a case where the temporary support was peeled off, with the area of the standard sample film on the temporary support as 100%.

In Table 7, the column of "Average film thickness (nm) of transferred standard sample film" represents an average film thickness of the standard sample film transferred to the silicon wafer side.

TABLE 7

| | Type of temporary support | Water contact angle of temporary support (degrees) | Average film thickness of standard sample film (nm) | Transferred area (%) | Average film thickness of transferred standard sample film (nm) |
|---|---|---|---|---|---|
| Example C1 | Polypropylene | 108 | 500 | 100 | 500 |
| Example C2 | Polyethylene terephthalate | 70 | 500 | 30 | 500 |

As shown in Table 7, the standard sample film could be transferred onto a silicon wafer, using a polypropylene film and a polyethylene terephthalate film as temporary supports. Above all, from the comparison of Examples C1 and C2, it was confirmed that the effect was more excellent in a case where the water contact angle of the temporary support was 100 degrees or more.

EXPLANATION OF REFERENCES

10: substrate
12: standard sample film
14: region
20: standard sample
22: region

What is claimed is:

1. A standard sample film for use in laser ablation inductively coupled plasma mass spectrometry, comprising:
    a polymer; and
    a metal element,
    wherein a maximum height difference in film thickness of the standard sample film is 0.50 μm or less.
2. The standard sample film according to claim 1,
    wherein an element concentration variation of the standard sample film obtained by the following Method X is 30% or less,
    Method X: at 10 points on a surface of the standard sample film, time-of-flight secondary ion mass spectrometry is carried out from one surface of the standard sample film toward the other surface of the standard sample film to obtain a profile of secondary ion intensity of the metal element in a depth direction, in a case where the position of 20% of a total thickness of the standard sample film from one surface of the standard sample film toward the other surface of the standard sample film is defined as the first position, and the position of 80% of the total thickness of the standard sample film from the one surface of the standard sample film toward the other surface of the standard sample film is defined as the second position, a total value of the secondary ion intensity of the metal element from the first position to the second position at each point is calculated, and then, a relative standard deviation of obtained 10 total values of the secondary ion intensities is calculated and defined as the element concentration variation.
3. The standard sample film according to claim 1,
    wherein an average film thickness of the standard sample film is 3.5 μm or less.
4. The standard sample film according to claim 1,
    wherein the metal element is derived from a metal salt of an organic acid or a metal salt of an inorganic acid.
5. The standard sample film according to claim 1,
    wherein the standard sample film contains two or more metal elements.
6. The standard sample film according to claim 1,
    wherein the polymer is a (meth)acrylic polymer.
7. A method for producing a standard sample film comprising:
    a step of applying a composition for forming a standard sample film containing a hydrocarbon, a metal salt of an organic acid, a polymer in which an absolute value of a difference from an SP value of the hydrocarbon is 3.5 $MPa^{1/2}$ or less, and a solvent to form a standard sample film.
8. The method for producing a standard sample film according to claim 7,
    wherein the organic acid has a hydrocarbon group, and
    an absolute value of a difference between an SP value of the hydrocarbon group and the SP value of the hydrocarbon is 3.5 $MPa^{1/2}$ or less.
9. A sample set comprising a plurality of the standard sample films according to claim 1 in combination,
    wherein the plurality of standard sample films contain the same type of metal element, and
    concentrations of the metal element in the plurality of standard sample films are different from each other.
10. A quantitative analysis method by laser ablation inductively coupled plasma mass spectrometry, comprising:
    a step A of, using a plurality of the standard sample films according to claim 1 in which concentrations of the metal element are different from each other, measuring a signal intensity of an ion of the metal element obtained from each of the standard sample films by laser ablation inductively coupled plasma mass spectrometry;
    a step B of creating a calibration curve based on concentrations of the metal element in the plurality of standard sample films and the signal intensity of the ion of the metal element of each of the plurality of standard sample films obtained in the step A; and
    a step C of, using a measurement sample containing the same type of metal element as the metal element in the standard sample film, measuring the signal intensity of the ion of the metal element in the measurement sample by laser ablation inductively coupled plasma mass spectrometry, and obtaining a concentration of the metal element in the measurement sample based on the calibration curve.
11. A transfer film comprising:
    a temporary support; and
    the standard sample film according to claim 1 disposed on the temporary support.
12. A standard sample for use in laser ablation inductively coupled plasma mass spectrometry, comprising:
    a hydrocarbon;
    a metal salt of an organic acid; and
    a polymer in which an absolute value of a difference from an SP value of the hydrocarbon is 3.5 $MPa^{1/2}$ or less.
13. The standard sample according to claim 12,
    wherein the absolute value of the difference from the SP value of the hydrocarbon is 2.5 $MPa^{1/2}$ or less.
14. The standard sample according to claim 12,
    wherein the polymer is a (meth)acrylic polymer.
15. The standard sample according to claim 12,
    wherein the hydrocarbon includes an aliphatic saturated hydrocarbon having 10 or more carbon atoms.
16. The standard sample according to claim 12,
    wherein the hydrocarbon includes paraffin.
17. The standard sample according to claim 12,
    wherein the organic acid has a sulfonic acid group.
18. The standard sample according to claim 12,
    wherein the organic acid has a hydrocarbon group.
19. The standard sample according to claim 12,
    wherein the standard sample contains two or more metal salts of the organic acid having different types of metal elements.
20. A sample set comprising a plurality of the standard samples according to claim 12 in combination,
    wherein the plurality of standard samples contain the same type of metal salt of an organic acid, and
    concentrations of a metal element derived from the same type of the metal salt of the organic acid in the plurality of standard samples are different from each other.

21. A quantitative analysis method by laser ablation inductively coupled plasma mass spectrometry, comprising:
- a step 1 of, using a plurality of the standard samples according to claim 12 in which concentrations of a metal element derived from the metal salt of the organic acid are different from each other, measuring a signal intensity of an ion of the metal element obtained from each of the standard samples by laser ablation inductively coupled plasma mass spectrometry;
- a step 2 of creating a calibration curve based on the concentrations of the metal element derived from the metal salt of the organic acid in the plurality of standard samples and the signal intensity of the ion of the metal element of each of the plurality of standard samples obtained in the step 1; and
- a step 3 of, using a measurement sample containing the same type of metal element as the metal element derived from the metal salt of the organic acid in the standard sample, measuring the signal intensity of the ion of the metal element by laser ablation inductively coupled plasma mass spectrometry, and obtaining a concentration of the metal element in the measurement sample based on the calibration curve.

22. A transfer film comprising:
a temporary support; and
a sample film consisting of the standard sample according to claim 12 disposed on the temporary support.

* * * * *